United States Patent [19]

Mahon et al.

[11] Patent Number: 5,551,723
[45] Date of Patent: Sep. 3, 1996

[54] PULSE SHAPING FOR AIRBAG INFLATORS

[75] Inventors: Geoffrey L. Mahon, Ridgewood; Peter Materna, Metuchen, both of N.J.

[73] Assignee: Breed Automotive Technology, Inc., Lakeland, Fla.

[21] Appl. No.: 278,377

[22] Filed: Jul. 20, 1994

[51] Int. Cl.⁶ .................................................. B60R 21/26
[52] U.S. Cl. .......................... 280/737; 280/742; 222/3; 251/902
[58] Field of Search ............................... 280/737, 736, 280/741, 742; 422/164, 165; 102/530, 531; 222/3; 137/513.5, 513.3, 517; 251/118, 121, 902; 138/46

[56] References Cited

U.S. PATENT DOCUMENTS

| | | | |
|---|---|---|---|
| 732,068 | 6/1903 | Haas | 138/46 |
| 1,871,287 | 8/1932 | Whittaker | 138/46 |
| 2,777,464 | 1/1957 | Mosely | 138/46 |
| 3,138,177 | 6/1964 | Cutler | 138/46 |
| 3,332,436 | 7/1967 | Welty | 138/46 |
| 3,409,050 | 11/1968 | Weese | 138/46 |
| 3,647,393 | 3/1972 | Leising et al. . | |
| 3,724,870 | 4/1973 | Kurokawa et al. . | |
| 3,752,500 | 8/1973 | Culver . | |
| 3,784,223 | 1/1974 | Haas et al. . | |
| 3,792,872 | 2/1974 | Jones . | |
| 3,815,935 | 6/1974 | Jones . | |
| 3,820,814 | 6/1974 | Allgaier et al. | 280/742 |
| 3,948,540 | 4/1976 | Meacham . | |
| 3,966,225 | 6/1976 | Marlow | 280/737 |
| 3,966,228 | 6/1976 | Neuman . | |
| 3,968,980 | 7/1976 | Hay . | |
| 3,984,126 | 10/1976 | Goetz et al. . | |
| 3,985,375 | 10/1976 | Lewis et al. . | |
| 3,986,456 | 10/1976 | Doin et al. | 280/741 |
| 4,006,919 | 2/1977 | Neuman . | |
| 4,018,457 | 4/1977 | Marlow . | |
| 4,021,058 | 5/1977 | Suzuki et al. . | |
| 4,332,398 | 6/1982 | Smith . | |
| 4,358,998 | 11/1982 | Schneiter et al. . | |
| 4,364,523 | 12/1982 | Parkinson et al. | 138/46 |
| 4,950,458 | 8/1990 | Cunningham . | |
| 4,998,751 | 3/1991 | Paxton et al. . | |
| 5,003,887 | 4/1991 | Unterforsthuber et al. | 280/742 |
| 5,009,855 | 4/1991 | Nilsson . | |
| 5,022,674 | 6/1991 | Frantom et al. . | |
| 5,054,811 | 10/1991 | Unterforsthuber et al. | 280/742 |
| 5,076,607 | 12/1991 | Woods et al. . | |
| 5,131,680 | 7/1992 | Coultas et al. . | |
| 5,195,777 | 3/1993 | Cuevas | 280/736 |
| 5,213,362 | 5/1993 | Coultas . | |
| 5,226,668 | 7/1993 | Delonge-Immik et al. . | |
| 5,230,531 | 7/1993 | Hamilton et al. . | |
| 5,242,194 | 8/1993 | Popek . | |
| 5,257,817 | 11/1993 | Cuevas . | |
| 5,263,740 | 11/1993 | Frey et al. | 280/741 |
| 5,273,312 | 12/1993 | Coultas et al. . | |
| 5,335,940 | 9/1994 | Cuevas . | |
| 5,345,876 | 9/1994 | Rose et al. . | |
| 5,348,344 | 9/1994 | Blumenthal et al. . | |
| 5,351,988 | 10/1994 | Bishop et al. . | |

*Primary Examiner*—Karin L. Tyson
*Attorney, Agent, or Firm*—Kane, Dalsimer, Sullivan, Kurucz, Levy, Eisele and Richard, LLP

[57] ABSTRACT

An inflator includes a vessel for a source of gas under pressure. A pulse shaping valving means in the form of a Belleville washer or a sliding valve actuated by a Belleville washer operates to shape the pulse of gas flowing out of the vessel. Other than for a brief initial moment the flowrate of gas has a slower value over time followed by an instantaneous more rapid value followed by a tapering off.

63 Claims, 16 Drawing Sheets

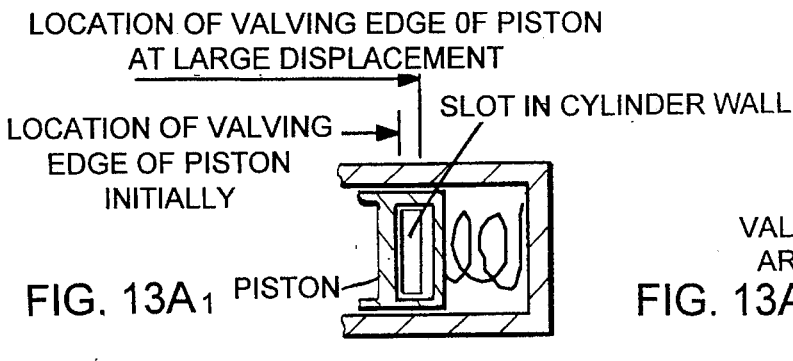
FIG. 13A₁
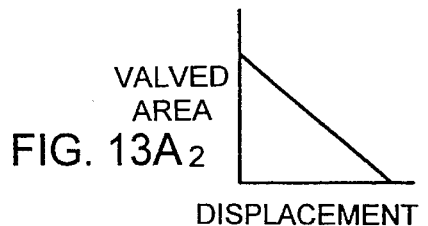
FIG. 13A₂
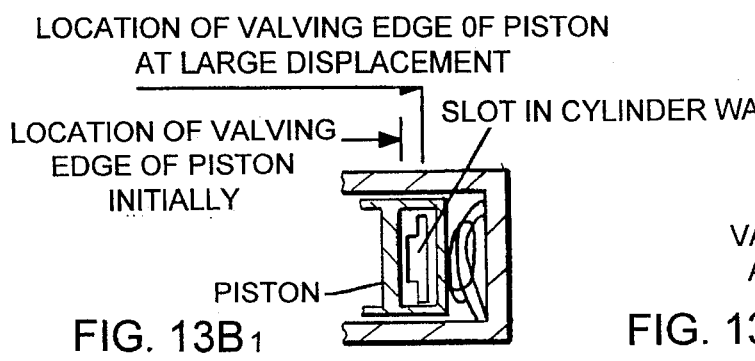
FIG. 13B₁
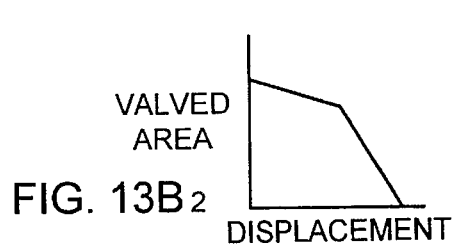
FIG. 13B₂
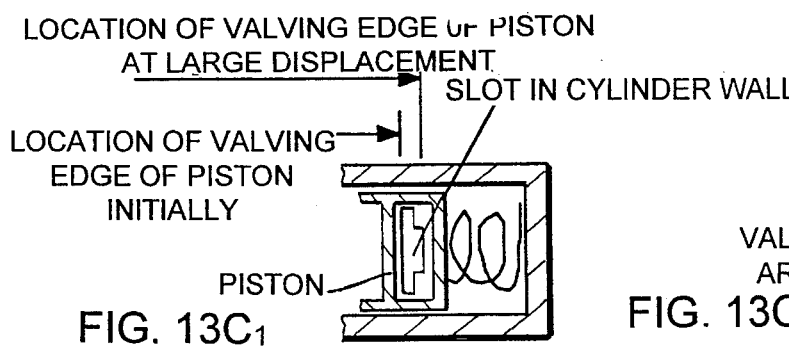
FIG. 13C₁
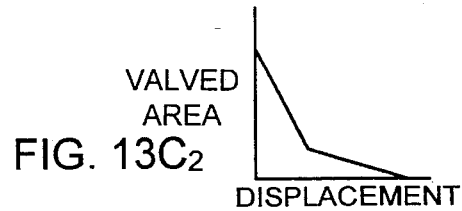
FIG. 13C₂
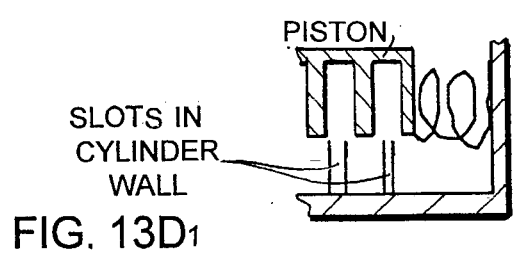
FIG. 13D₁
FIG. 13D₂
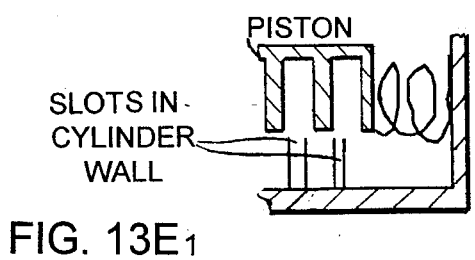
FIG. 13E₁
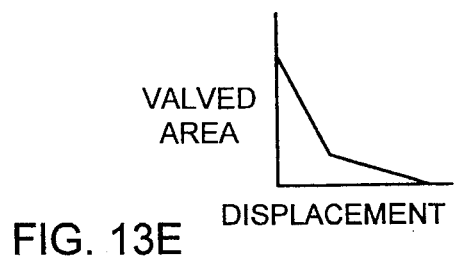
FIG. 13E

PULSE SHAPING FOR AIRBAG INFLATORS

FIELD OF THE INVENTION

The present invention relates to an apparatus for inflating a device such as an inflatable vehicle occupant restraint.

BACKGROUND OF THE INVENTION

As the technology for vehicular inflatable restraints (airbags) advances, more attention is being paid to certain details of the performance of gas generators or inflators. One of these details is the shape of the pulse of gas produced by the inflator, which may be described as flowrate as a function of time.

In many of the simpler or older inflator technologies, the flowrate of gas produced either is or closely resembles a monotonically decreasing function of time as the inflation transient progresses. For example, in many of the pure pyrotechnic inflators, although there is a brief time during which ignition propagates and the inflator interior reaches its peak pressure, that time period is a very small portion of the inflation transient and by far the predominant phenomenon is that the flowrate generally decreases as the transient progresses. Other inflator technologies may involve stored gas, either as the only source of gas (in the case of pure stored gas inflators) or as a source of a portion of the gas (as is the case for hybrid inflators, which combine stored gas with solid pyrotechnics). For the discharge of stored gas, the natural shape of the discharge flowrate is approximately a decaying exponential, in which the flowrate is greatest at the beginning and continually decreases thereafter. For hybrid inflators, depending on details of the inflator design, the natural shape of the pulse may also be a flowrate which is generally decreasing as the transient progresses.

For driver side inflators, a flowrate which is generally decreasing as the transient progresses may be acceptable. However, especially for passenger side inflators, it is desirable to have a more complicated inflator performance which is referred to herein as pulse-shaping. For typical automobiles, the time (after the start of a crash) by which the passenger side inflator must be fully discharged is 50 ms to 100 ms. For such an inflation, it is desirable that the flowrate of gas out of the inflator be somewhat gentle for the first 5 to 20 ms of that period, and after that the flowrate should be relatively larger, and then toward the end of that period the flowrate should taper off. This means that when inflator testing is performed by discharging the inflator into a closed receiving tank, as is commonly done during inflator development, the pressure transient in the receiving tank should appear as a gently rising pressure vs. time trace, followed by a more steeply rising portion of the pressure vs time trace, followed by a leveling off at a final value. This characteristic is referred to as the S-shaped curve which is an example of a monotonic curve.

The S-curve is desirable principally because of the possibility of a so-called out-of-position occupant on the passenger side of a vehicle. On the driver side of a vehicle the expected position of the driver at the start of the accident is fairly well known, but on the passenger side there can be one or two children and/or adults in any of a variety of positions including relatively close to the instrument panel. If the occupant happened to be close to the instrument panel at the beginning of bag deployment, when the fill rate of a non-pulse-shaped inflator is most rapid, there would be the possibility of a bag-induced injury. The gentle early flowrate of gas from the inflator is helpful so that the airbag can perhaps reposition or cushion an out-of-position occupant during the early portion of the inflation without subjecting him or her to harmful decelerations. The more rapid flowrate later is necessary so that the airbag completes its inflation within the time period of the typical crash. Finally, the tapering off at the end of pulse is a natural consequence of the inflator nearing the end of its discharge process. Having a brief gentle early period during the inflation can help to lessen the forces on the bag and associated anchoring structures as the bag begins to unfold. If the flowrate were excessive in the very early portions of the transient, such forces could tear the bag.

There are some techniques that have been used or are presently being used to produce pulse-shaping. As mentioned, pure pyrotechnic inflators have a slight natural tendency to produce an S-shaped curve, but the portion of the curve which exhibits the gentle build-up tends to be only of a very brief duration of the order of a few milliseconds, not as much as may be desired for pulse-shaping at most. This is described in Society of Automotive Engineers paper 920120, Advances in Analytical Modeling of Airbag Inflators, by Peter Materna. Some pyrotechnic inflators are also designed with the pyrotechnic subdivided into more than one chamber in order to ignite the pyrotechnic in stages so as produce pulse-shaping. Other types of inflators produce pulse-shaping by some means separate from the combustion process, means which essentially vary the exit area through which gas can flow. For example, some inflators include a movable object in the exit path such that as the object moves under the influence of a pressure difference it uncovers additional exit area. Because of the very large internal pressures at which inflators are typically designed to operate, the inertia alone of a reasonably sized movable object is not sufficient to produce the desired duration of pulse-shaping. Thus, the movable object is backed by an energy absorbing substance or component, such as a crushable rubber-like substance or a crushable metal honeycomb structure. However, in such inflators, the movable part involves close-fitting parts such as pistons and cylinders which may have risk of binding or sticking, particularly given the large unpredictable accelerations found in vehicles during crashes. These inflators also do not deal with the question of how to provide this pulse-shaping over a wide range of inflator initial temperatures. The inflator initial temperature influences not only the characteristics of the energy absorbing material (especially in the case of rubber) but also how the pressure in the interior of the inflator (which acts on the energy-absorbing material) may change with ambient temperature. This latter influence is especially present if stored gas is involved. There are also some pulse-shaping techniques which involve two actuating events, one to cause the gentle fill portion and another to cause the rapid fill portion of the inflation. Typically, an electronic timing circuit sequences the two events. This could involve, for example, igniting two different pyrotechnic charges sequentially. However, the drawback of such a system is that from a reliability point of view, there is more opportunity for the system to fail to operate correctly. From a reliability point of view, it would be preferable if there were only a single actuating event such as ignition of a pyrotechnic, and all other events including pulse-shaping followed as a consequence of that one actuating event.

Overall, it can be said that there still is not a completely satisfactory method for producing pulse-shaping at the conditions of extremely high pressures and short time scales and widely varying initial temperatures typically found in airbag inflators.

OBJECT OF THE INVENTION

Accordingly, it is an object of this invention to produce an inflator in which the flowrate of output gas has an initial relatively slower value, followed by a more rapid value, followed by a tapering off, all taking place during the brief period of time of a typical vehicle crash.

It is another object of the invention to produce this pulse-shaping by mechanical means using parts which preferably do not have close-tolerance sliding parts that could stick or bind.

It is further an object of the invention that the inflation occur using only a single actuating event, with all other events including the pulse-shaping following automatically from that one actuating event.

It is still another object of the invention to produce a pulse-shaping means which, if necessary depending on the inflator technology used, can adjust itself to operate properly at a wide range of ambient temperatures.

It is still further an object of the invention to provide a valving device to produce pulse-shaping of the foregoing type.

BRIEF DESCRIPTION OF THE DRAWINGS

FIG. 11a is an enlarged elevational view of the "O" ring and seat.

FIG. 13 shows relationships between flow area and position which can be achieved using the foregoing alternate embodiments.

DETAILED DESCRIPTION

Figure 1:
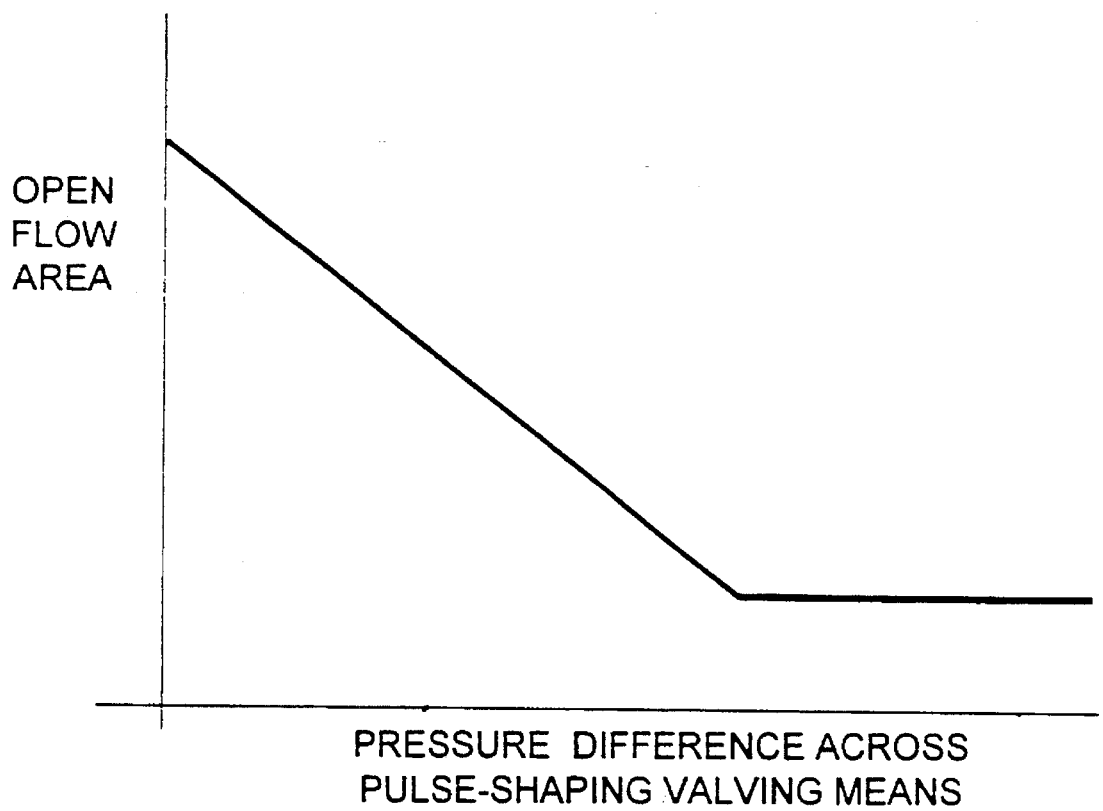
FIG. 1 is a representation of the relation, under quasi-static conditions, of flow area through the pulse-shaping device as a function of pressure difference acting across it.

The present invention produces pulse-shaping by using the force or load created by the pressure of the gas inside the inflator, acting on a spring or elastic device, to vary the exit area for flow of gas exiting the device. Although force or load is most directly the determining factor of the behavior of the pulse-shaping device, force or load may be influenced by hard-to-determine local flow details and is not easily measurable, so in some places this disclosure will refer to the behavior of the pulse-shaping device as a function of the pressure difference acting across it. Pressure difference is much more easily measurable. According to the invention, the quasi-static behavior of the pulse-shaping device should be such that the exit area generally decreases as the pressure difference across the pulse-shaping device increases, but the device never completely closes. This relation is represented in graphical form in FIG. 1 for the simplest case, with the relation being shown as idealized to represent a linear elastic spring with an assumed direct relationship between valved area and position, and with a fixed always-open area for pressure differences larger than a certain value.

In practical terms, the exit area may comprise two somewhat distinct flowpaths and exit areas, one of them being an always-open area which is constant, and the other being a variable area which is dependent on pressure difference across the pulse-shaping device. The variable area is a function of the position of the movable part and can go to zero when the movable part is appropriately positioned. The always-open area may consist of always-open orifices or, as will be described later, castellations which provide always-open area, or similar geometric features built into the device. It is advantageous to provide the always-open area as a somewhat separate feature or orifice as opposed to an arrangement where that area is tied to the relation which governs the variable area. If the minimum area were tied to the relation which governs the variable area, it might be possible for the total area to accidentally approach zero as a result of accidental overshoot of the movable part of the pulse-shaping device, or miscalculation of its position. Even if this did not occur, having the minimum area tied to the relation which governs the variable area would perhaps make the behavior undesirable sensitive to exact details of the initial conditions. The provision of two separate, somewhat distinct orifices should make for somewhat more robust behavior, is a manufacturing convenience, and virtually guarantees that the always-open area cannot be accidentally closed, which is an advantage in qualifying the device as far as failure mode and effects analysis.

In accordance with certain embodiments of the present invention, the element used as the spring in the valving function is a deformable washer which is loaded in a direction parallel to its principal cylindrical axis, causing it to deflect as a function of load. More particularly, the deformable washer may be a Belleville washer or disc spring (used synonymously herein). A Belleville washer or disc spring is a disc in the shape of an annulus, with its axial thickness relatively small compared to its inside and outside diametral dimensions, and manufactured so that it does not occupy a flat plane but rather tilts slightly out of plane in a circularly symmetric manner, resembling a dish. It is usually made of metal. A Belleville washer is usually used so that the direction of load is such as to tend to push it back into plane. Belleville washers are widely used for maintaining clamping load in bolted joints, and they are also used for various other applications. Compared to other types of springs such as coil springs, Belleville washers or disc springs are known to be relatively compact for the amount of force generated or mechanical energy stored. They are also known for being able to provide, in certain parameter ranges, a nonlinear force-deflection characteristic even while the washer material is not stressed beyond its elastic limit.

In accordance with certain embodiments of the present invention, in addition to deflecting under the action of the gas pressure, the Belleville washer also performs the valving function because one or more of its edges or surfaces which deflect due to load is also an edge or surface which changes a flow area. This combination of functions is beneficial because it simplifies design by reducing the number of parts and eliminating the need for sliding, close-tolerance parts.

In accordance with certain other embodiments, there is provided a separate piston-like element in addition to the spring (which may be a Belleville washer or any other type of spring). This feature provides a further adjustment means by which a more arbitrary relation can be created between the position of the spring and the area of the orifice.

In an inflator to which this invention is applicable, the transient begins when a signal from a crash sensor causes an event which creates a large pressure difference across the pulse-shaping device. This pressure difference may come about as a result of a very rapid type of combustion such as a detonation inside the inflator, or as a result of a rupture disc rupturing in some other manner, or as a result of some other event. For ease of illustration and explanation of the pulse-shaping device, it is assumed that the pressure difference across the pulse-shaping device goes from zero to its large value instantaneously or faster than any other time scale important in the problem. However, it may be appreciated by those skilled in the art that even for a combustion which is slower than a detonation, such as the combustion found in conventional pyrotechnic inflators, the present invention also has application.

Figure 2:
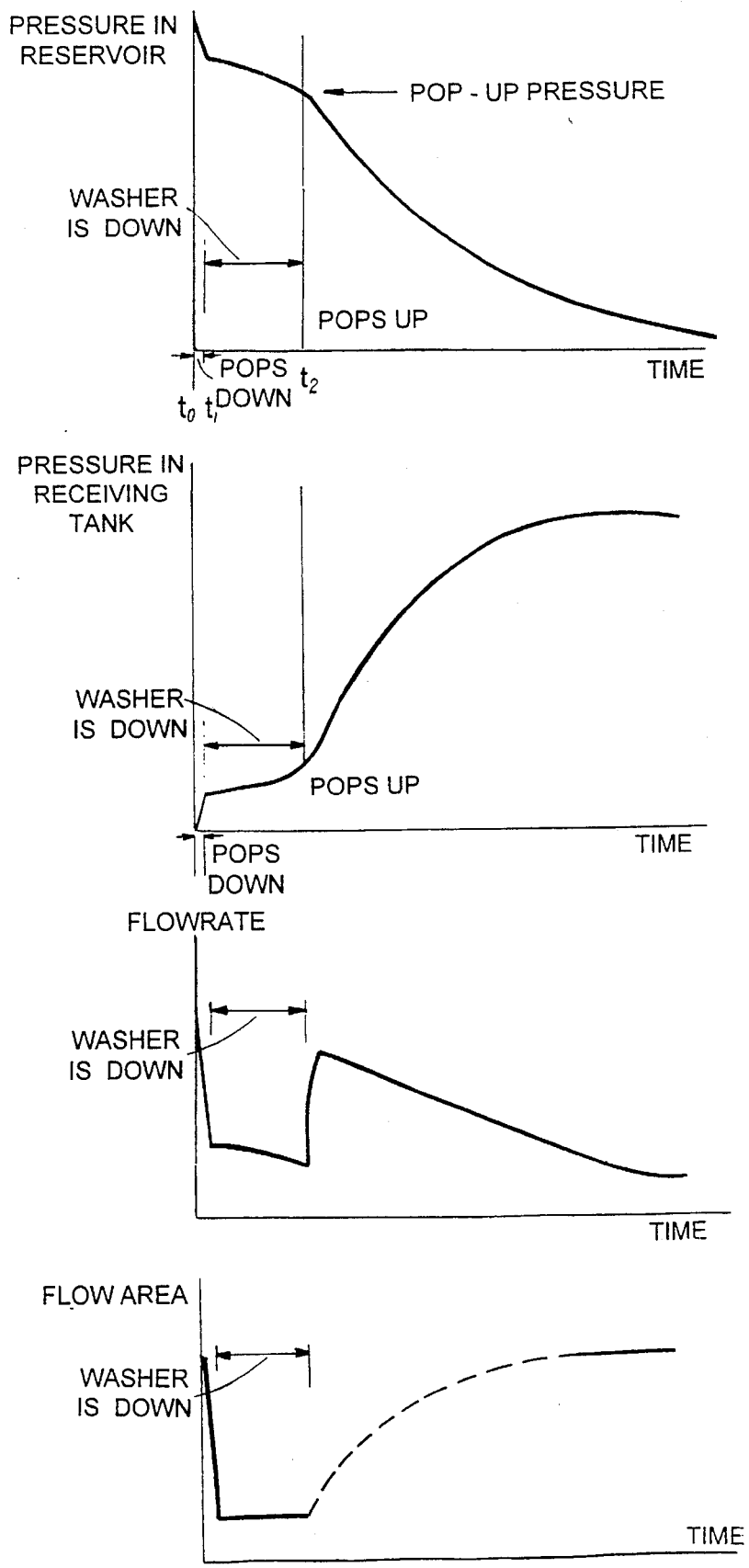
FIG. 2 is a representation of four different quantities as a function of time during the transient.

The creation of the large pressure difference across the pulse-shaping device initiates a sequence of events which is graphically summarized in FIG. 2. FIG. 2 contains representative time histories of the pressure in the receiving tank, the pressure in the reservoir, the flow area available through the pulse-shaping device, and the mass flowrate through the pulse-shaping device. These two pressure versus time curves are monotonic. The first two quantities are typical of curves from direct experimental data, while the last two quantities are inferred. The receiving tank curve is a monotonically increasing function, and the reservoir curve is a monotonically decreasing function, with there being in each case some changes of slope at certain times during the transient. Designation of events in time are: t0 is the creation of the large pressure difference across the pulse-shaping device, considered instantaneous; t1 is the time when the movable device bottoms against its seat or the flow area has decreased to reach its always-open value; t2 is the time when the movable device begins to lift up from its seat and the flow area begins increasing again above its always-open value.

Between t0 and t1, the pressure difference acts to push the movable part of the valve to a point where the movable part bottoms against a seating surface. When the movable part bottoms against the seat, the variable portion of the flow area is completely closed but the always-open flow area remains open. It is found that for the designs and parameter ranges of interest here, the time between t0 and t1 is short, typically a few milliseconds. During this time between t0 and t1 there is a certain amount of gas which exits the inflator at a large flowrate. This gas escape is not one of the features traditionally sought in pulse-shaping as it was described in the introduction or objects of the invention. However, since this occurrence is usually limited to only the first few milliseconds and the first 5% or so of the gas flow, it is considered tolerable; it might even be useful to help cause the bursting of the cover of the instrument panel (door), depending on details of the design of that component such as how much energy or mechanical work is required to burst it.

Once the movable part of the pulse-shaping device has bottomed against the seat at t1, this begins the gentle-fill portion of the transient in which the flow has available to it only the always-open area. Because the flow area is the smallest it is at any time during the transient, the upward slope of the tank pressure transient is relatively gentle, and the downward slope of the reservoir pressure transient similarly is relatively gentle. This lasts until t2. During this stage the gas exits from the reservoir and depletes the reservoir pressure until at t2 the reservoir pressure is no longer sufficient to hold the movable part bottomed against its seat. Design parameters must be chosen so that t2 occurs at a desired time during the transient and at a desired fraction of gas discharge. The value of reservoir pressure at which the washer begins to lift up is significant for design purposes and it is referred to herein as the break-point pressure or pop-up pressure. For purposes of obtaining the break-point pressure or pop-up pressure used in discussions herein, the reservoir pressure transient near the break point during the rapid-discharge portion of the transient is extrapolated backward and the reservoir pressure transient near the break point during the gentle-discharge portion of the transient is extrapolated forward to obtain an intersection point, as shown in FIG. 1. Typically a desirable value of t2 would be between 10 and 30 ms. Typically a desirable value of the pop-up pressure would be between 70% and 90% of the initial or peak pressure, which roughly indicates (ignoring for the moment change of temperature of the remaining gas due to decompression) that the fraction of gas that has been discharged at the time of pop-up is between 10% and 30%.

At around t2 the movable part of the pulse-shaping device begins to lift up from its seat and begins to spring back toward its original position. This increases the exit area and the flowrate and produces the more rapid fill rate desired for the later portion of the transient. During all of the remainder of the transient, the movable part remains away from the seat. Eventually, the flowrate of the exiting gas tapers off due to depletion of the gas source.

The washer behavior exhibits a kind of bistability. If we are to achieve pulse-shaping, the reservoir pressure at the start of the transient must of course be larger than the break-point pressure of the washer. In general, for purposes of explaining the invention, it is simply necessary to understand that (a) in a well-designed system the range of conditions under which pulse-shaping is achieved is quite broad; (b) the factors which determine the existence and extent of pulse-shaping can be reliably controlled by the designer; (c) it is desirable that there is not a significant pressure drop downstream of the pulse-shaping valving device; and (d) when pulse-shaping is achieved it is found to be extremely repeatable.

The embodiments described here are generally configured so as to resemble a passenger side inflator rather than a driver side inflator, in part because of the greater need for pulse-shaping on the passenger side and in part because of the greater amount of space available in which to add design features such as a pulse-shaping device. Passenger side inflators, which are typically mounted in the instrument panel of a vehicle, are typically cylinders of a diameter between 60 and 100 mm, and a length of approximately 300 mm. However, the principle should also be considered applicable to driver side or other types of inflators if pulse-shaping is desired there.

Means are also provided in the invention for modifying the behavior of the pulse-shaping device as a function of initial temperature, on the knowledge or expectation that the pressure difference acting on the pulse-shaping device will have a variation as a function of initial temperature. This pertains particularly to stored gas systems. Embodiments containing this feature are presented as some of the later embodiments. In most of the embodiments with a self-adjusting feature, this is accomplished by making the deformable washer out of bimetallic materials. In another embodiment the deformable washer is made out of a single material, but the seat is made of a thermally expanding material and thereby varies its position. In either of these methods, the initial gap of the pulse-shaping device varies as a function of initial temperature, on the knowledge or expectation that the pressure difference acting on the pulse-shaping device will have a variation as a function of initial temperature. First, however, it is logical to explain the simpler embodiment so that the additional feature of self-adjustment with temperature can then be added as a refinement.

The first four embodiments which will be presented are embodiments which do not self-adjust as a function of initial temperature, and they can be used for a case for which the peak pressure difference which acts across the pulse-shaping device is a quantity which is essentially constant or which varies only over a quite narrow band (say, 5% or 10%). One inflator technology to which this embodiment corresponds is an inflator which contains a gas carried at moderate pressure during normal driving conditions, which is heated by combustion or pyrotechnic means quite rapidly. Assuming also that the combustion is quite rapid, the pressure vessel will be full of gas at the final state after combustion before there is any significant outflow of gas. Thus, this situation is for practical purposes essentially the situation of having to design for only a single known value of pressure difference acting across the pulse-shaping device.

These first embodiments could also correspond to the case of an inflator which uses solid or liquid chemicals, rather than combustible gas, to generate gas, if the total duration of combustion of such chemicals resembled that of a detonation, i.e., for practical purposes were less than several milliseconds, i.e., went to completion is a time period too short for any significant gas outflow to occur. This is to be contrasted with the case for most present-day pyrotechnic inflators, which are instead designed so that the combustion, while still rapid to ordinary human senses, is of a duration roughly equal to the length of time it takes to inflate the airbag, which is several tens of milliseconds or in some cases closer to 100 ms.

These first embodiments could also correspond to the case of a stored-gas inflator which was only required to operate at a single temperature or a narrow range of temperatures, although such a situation is not of as much practical importance.

In gaining an analytical understanding of this inflator system, a useful simple model is a lumped-parameter model where the interior of the pressure vessel is considered a single volume and it is considered to discharge through an exit orifice area. In the actual geometry of a pulse-shaped inflator, there are possibly two orifices of significance, namely the orifice at the rupture disc and the (variable) area at the pulse-shaping device. As will be described later, the pulse-shaping device is preferably located downstream of the rupture disc orifice. For use in the simplest of lumped-parameter models, it would be necessary to combine these two orifice areas into a single effective orifice area and, given the properties of compressible flow through series orifices, it is likely that in this situation the area at the deformable washer would have the more dominant influence in determining the effective area of a single equivalent orifice. Because of the large pressures involved, there is choked flow.

From this simplest of lumped-parameter models comes a scaling relationship which gives a time constant for an approximately exponential decay of the pressure in the pressure storage vessel. The discharge of gas in this situation can be approximately described by a time constant which is proportional to (storage vessel volume/(exit area * speed of sound)). In slightly more detail, this formula can provide us with an approximate decay time constant for the situation wherein the pulse-shaping device is at its minimum-area (always-open area) position, and another different time constant for the situation wherein the pulse-shaping device is fully or at least partly open. It illustrates that the ratio of the slopes of the gentle-fill and the rapid-fill portions of the transient will be significantly related to the ratio of the always-open area to the sum of the always-open and the variable areas. Of course, as in much airbag work, it is frequently a challenge to provide a sufficiently rapid inflation, and especially so when we are deliberately slowing down an initial portion of the fill.

For the present situation, in order to contain enough gas to fill a passenger airbag, and given practical limitations for vessel dimensions and storage pressure, the volume of the storage vessel is determined within a narrow band. Smaller volume and hence faster discharge could be achieved with correspondingly higher peak pressure, but there are practical limitations on that trend. For a typical passenger side inflator contemplated here, the peak pressure inside the inflator (at hot design conditions, in the case of a stored gas inflator) would be 3000 psi (20.7 MPa) to 6000 psi (41.4 MPa), and the volume of gas present at that pressure before discharge would be about 0.9 to 1.0 liters at the higher pressure to 1.7 to 1.9 liters at the lower pressure. This is intended to fill a 150 liter bag, assuming typical values of desired pressure in the bag above atmospheric pressure and appropriate venting from the bag to provide for appropriate deflation characteristics of the bag upon impact by the occupant. The available exit area from the pulse-shaping device is determined by values of washer dimensions and motion and material properties of washers. This is a feature with some opportunity for variation of performance by means of design details, but there are practical limitations here also. The third important physical property is the speed of sound of the gas. The gases which are products of combustion are typically carbon dioxide and water vapor if the combustion is of a hydrocarbon which is a likely candidate for a combustible stored gas. There may also be some amounts of an inert gas such as nitrogen or argon. The molecular weights of these various gases just mentioned range from 18 to 44. Thus, depending upon chemistry and proportion, the average or effective molecular weight of the gas mixture would be between 18 and 44, probably around the middle of that range. The post-combustion temperature of these gases is likely to be in the range of 2000K. As a result, the speed of sound of the gases after combustion is likely to be in the range of 1000 m/s. In another inflator technology, for the pure stored gas inflator contemplated with pulse-shaping, the stored gas is preferably helium near room temperature, whose speed of sound also happens to be approximately 1000 m/s. Both of these values are fortunate, because given the practical range of volume of the pressure vessel and the possible area limitation of the pulse-shaping device, it is helpful for the gas to have a large speed of sound such as the value just given.

Another useful result from theory concerns the properties of compressible flow through series orifices assuming that in between the orifices there are volumes in which flow equilibration (dissipation of jets) takes place. With incompressible flow, of course, two equal-area orifices in series will have equal pressure drops across them. In contrast, with compressible flow in steady-state or quasi-steady-state conditions, the pressure drop across the more downstream of the two equal-area orifices will be substantially larger than the pressure drop across the more upstream orifice. Choking will exist at the more downstream orifice. This means that if one desires pressure drop to be somewhat equally distributed among a series of orifices, then those orifices should increase in area as the flow progresses downstream. Conversely, if one wants a particular orifice to have the predominant pressure drop, unless there are vast differences in flow areas among the orifices, it is best for that particular orifice to be the most downstream orifice. In general, for highly compressible flow situations such as are encountered here, such considerations of area ratio are more important for design and estimation than details related to changes of flow direction, streamlining, etc.

EMBODIMENT 1

Figure 3:
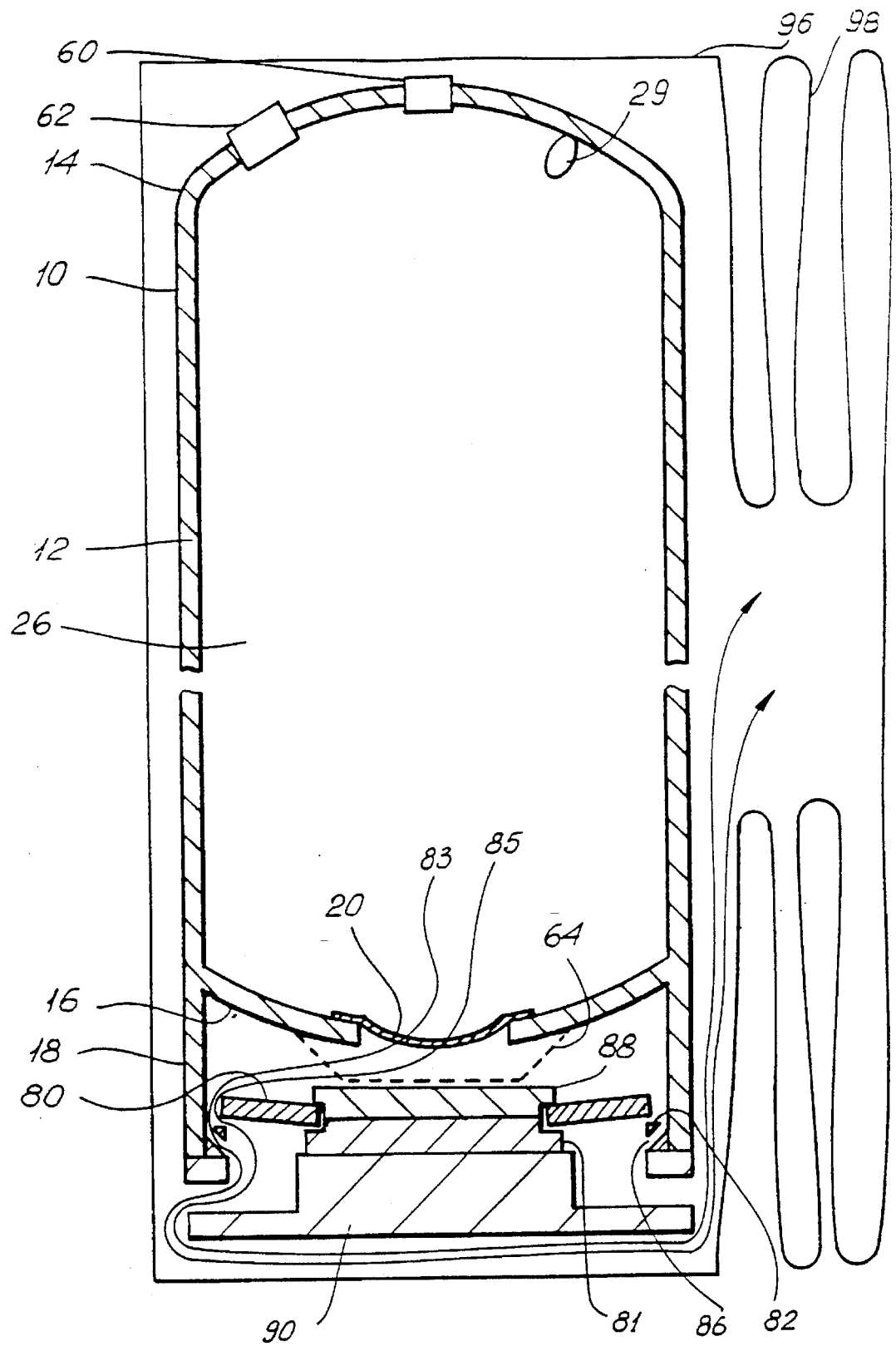
FIG. 3 is a section view of an inflator together with its housing and airbag, showing the pulse-shaping means according to a first embodiment.
Figure 3A:
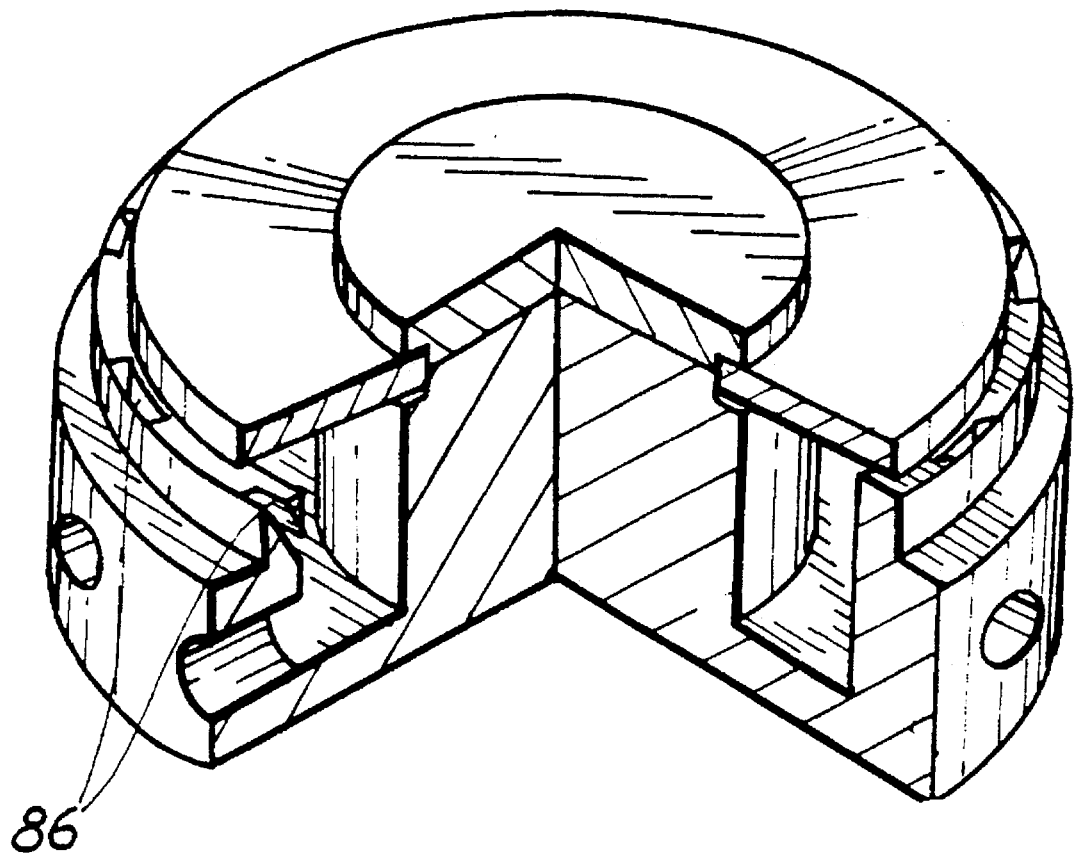
FIG. 3a is an enlarged perspective view showing the slots or castellations of the embodiment of FIG. 3.

Shown in FIG. 3 is the inflator of the first embodiment as it would exist during normal driving, in which there is no pressure difference or net load acting across the pulse-shaping device. It comprises a generally cylindrical pressure vessel 10, which comprises a cylindrical portion 12, a semiellipsoidal or hemispherical end cap 14 away from the discharge end and an end cap 16 containing an orifice which is disposed to receive a rupture disc or rupturable wall 20. Rupturable wall 20 may be disposed so that it coincides with the principal axis of generally cylindrical pressure vessel 10. Contained within pressure vessel 10 is combustible means 26 which upon combustion instantaneously causes pressure vessel 10 to be filled with gas at high pressure. Combustible means 26 can be either gas or other state, with the principal requirement being that it complete its combustion within a very short time period such as several milliseconds so that the task facing the pulse-shaping device is to discharge an essentially fully-generated load of gas in a pulse-shaped manner. Also included is igniting means 29 which ignites combustible means 26 upon signal from a crash sensor. Igniting means 29, which could be a device resembling a spark plug or could also be a pyrotechnic device, is mounted in one of the domes 14 or 16 (shown here in dome 14).

A rupture disc is a thin piece of a material, usually a metal, which constitutes a weak point in a pressure boundary, such that at a known pressure the rupture disc reaches its breaking point and tears open spontaneously. Rupture discs are most commonly used as passive safety devices with pressure vessels and process equipment to prevent excessive pressure which might damage the vessel or equipment, and for this purpose they are used in the mode where they fail spontaneously. In an inflator of the type described here, if the inflator contains combustible gas, there will be a ratio of typically 5 to 10 between the pressure inside pressure vessel 10 when combustion is completed and the pressure of the combustible gas mixture which exists inside pressure vessel 10 during normal driving. If the spontaneous burst pressure of the rupture disc is somewhat higher than the pressure of the combustible gas mixture but less than the post-combustion pressure, the rupture disc will rupture spontaneously when combustion is complete. (The difference between pre-combustion and post-combustion gas pressures is so large that it is easy to assure that the spontaneous rupture pressure of the rupture disc will be in the appropriate range.)

Included in the pressure vessel 10 is a port, 60, through which the pressure vessel can be filled and which can then be sealed. Also included, optionally, is a pressure monitor or sensor, 62, so that any possible leakage of gas out of the pressure vessel during long-term storage can be detected. The pressure monitor 62 should additionally include a temperature monitor because in order to interpret a pressure reading and determine whether any gas has leaked out, it is necessary to know the temperature of the gas whose pressure was measured. Also shown is a fragment catcher 64 which may basically be filter mesh and associated support structure, shown in phantom and disposed immediately downstream of rupturable wall 20. Depending on the details of the rupturable wall 20 and igniting device 29, such a device may be needed to assure that no fragments of the rupturable wall or of the igniting device can enter the pulse-shaping device or the airbag. It is desirable that the fragment catcher not be a significant pressure drop and so the open flow area of the fragment catcher is preferably somewhat larger than the open flow area of the rupture disc.

Disposed downstream of end cap 16 is a skirt 18 extending axially from cylindrical portion 12 of pressure vessel 10, having substantially the same cylindrical geometry as cylindrical portion 12 of pressure vessel 10. Washer 80, which may be a Belleville washer, located inside skirt 18, is the valving device which is deflected by the load or pressure acting upon it. Skirt 18 provides part of the structural load path which carries load exerted on the washer 80 back to the pressure vessel 10. Skirt 18 also helps to define the closed fluid mechanical boundary which requires that the gas which exits through rupturable wall 20 must all flow through the pulse-shaping device in order to reach the airbag. At the end of skirt 18 farthest from pressure vessel 10 is a bridge structure 90, which extends across at least some of the open end of skirt 18 and is disposed so as to carry load and transmit that load from washer 80 to skirt 18.

In this embodiment, washer 80 is structurally supported at its inner circumference, with the outer circumference being free to move upon action of pressure difference. Gas can flow under the movable outer edge of washer 80, but no path is provided for flow of gas under the inner supported edge of washer 80. Washer 80 is structurally supported by support ledge 81 which is in turn structurally connected to bridge structure 90 which is in turn structurally connected to skirt 18. Support ledge 81 may also, by having a lip or similar feature on it, serve the function of locating washer 80, preferably locating it so that its axis coincides with the axis of the flow discharge through the fragment catcher 64. If washer 80 is a Belleville washer, it may be preferable for the washer to be mounted so that the action of the pressure difference during the inflation transient tends to push the washer back into plane, flatter than when it is unloaded. This configuration may be referred to as an upside-down configuration, and to distinguish this from certain later embodiments it may be referred to as uniflow because there is principally only one direction of flow. A retainer 88 may be provided such that washer 80 is kept in place or captured between support ledge 81 and retainer 88, thereby preventing washer 80 from falling or bouncing away from its intended location either during normal driving or during the inflation transient. Retainer 88 may comprise a protrusion extending a short distance over the edge of washer 80 on the side of the washer which is not in contact with support ledge 81, or similar construction. Seat 82 is a circularly symmetric protrusion or extension from bridge structure 90 or skirt 18 structurally connected to either bridge structure 90 or skirt 18. The dimensions (diameter, etc.) of seat 82 must be such that washer 80 can touch seat 82 if washer 80 is appropriately loaded, and seat 82 must be located such that pressure caused by the rupture of rupturable wall 20 pushes the movable edge of washer 80 toward seat 82. We would say that seat 82 is located on the downstream side of washer 80. Furthermore, seat 82 must be located such that at least some of the flow must pass between seat 82 and the nearby edge or surface of washer 80 so that the gap between seat 82 and the nearby edge or surface of washer 80 constitutes a valving action.

The flow of gas from the region upstream of washer 80 to the region downstream of washer 80 preferably comprises two somewhat separate and distinct flowpaths: an always-open flowpath 83 and a variable-area flowpath 85. Even though in some instances these two flowpaths may be adjacent to each other, it is helpful for the sake of clarity and explanation to separately identify them. Flowpath 83 proceeds from the source of gas, through a minimum flow area in flowpath 83 which is provided by a constant orifice or orifices whose total flow area is unaffected by motion of washer 80, and thence through the open path in bridge structure 90, and thence into the housing 96 and airbag 98. In one method of providing always-open flowpath 83, seat 82 is preferably not continuous all the way around the circumference, but rather preferably contains a plurality of small slots or castellations 86, preferably in a symmetric pattern, which form an always-open flowpath 83 even when Belleville washer 80 is touching seat 82. Alternatively (not shown in FIG. 3), seat 82 may be continuous so as to provide continuous contact with washer 80 when washer 80 is pressed against seat 82, but a permanently open orifice or set of orifices may be provided elsewhere connecting the region upstream of the washer 80 with the region downstream of washer 80. Variable-area flowpath 85 proceeds from the source of gas, through a minimum flow area in flowpath 85 which is defined by seat 82 and the nearby edge or surface of washer 80 which faces seat 82, and thence through the open path in bridge structure 90, and thence into the housing 96 and airbag 98. The minimum area in flowpath 85 is directly related to the gap between seat 82 and the nearby edge or surface of washer 80, and it goes to zero when washer 80 touches seat 82. In FIG. 3, seat 82 is shown as being located very near the outer circumference of washer 80. This is one possibility, but another is that seat 82 be located at a slightly smaller radius than the outer edge of washer 80, which should provide an extra variable for fine-tuning pulse-shaping performance. Extending intermittently across the lower end of skirt 18 is bridge structure 90 which serves to carry load or force exerted by the inner edge of washer 80 when a pressure difference is acting on the washer. Bridge structure 90 preferably has a substantial open area so that after gas has flowed through the valving action formed by Belleville washer 80 and seat 82, it continues to flow through bridge structure without significant flow resistance. Bridge structure 90 may include a right angle elbow ducting for the flow after the flow passes through the valving action formed by seat 82 and the nearby edge or surface of washer 80, so that the gas flow exits the inflator in a radial direction. Available choices include flow exiting radially, flow exiting radially but preferentially toward the airbag, and flow exiting axially. If the flow exits radially in a symmetric pattern, then the inflator ideally does not generate any thrust as it discharges. Preferably, the open flow area through bridge structure 90 is larger than, even as much as twice as large as the total of the always-open flow area and the valved flow area. After the gas flows through bridge structure 90, housing or diffuser or duct device 96, collects the gas when it leaves the inflator exit and directs the flow of the gas from the inflator exit to the airbag. Finally, the airbag 98 inflates to protect the vehicle occupant.

It is found that a design feature which is helpful to achieving pulse-shaping is to locate the washer 80 and valve seat 82 and other associated components downstream of rupturable wall 20, as is illustrated in FIG. 3, so that there is as little as possible pressure drop after the gas leaves the pulse-shaping valving. In this invention the valving by means of varying flow area is the major effect, so the pressure drop at the valving should be the major pressure drop in the flow circuit. Because of the properties of compressible flow through series orifices, this means it is desirable that the valving is as far downstream as possible in the flow circuit. Also, in this configuration, it is preferable that the open flow area at rupturable wall 20 when it has ruptured should be roughly equal to or somewhat larger than the total of the always-open and the valved flow areas in the pulse-shaping valving device. This helps to assure that the largest pressure drop in the flow circuit will be across the pulse-shaping valving device. It is found that if there is appreciable pressure drop after the gas leaves the pulse-shaping valving, such as might occur if the rupturable wall 20 were instead located downstream of the valving (washer 80, valve seat 82 and associated components), this can shrink the region of parameter space in which pulse-shaping is achievable. In the preferred situation where there is no orifice or other significant source of pressure drop downstream of the pulse-shaping device, pulse-shaping can be achieved for any ratio (pop-up pressure / initial pressure) up to 90% or perhaps more. However, if there is a significant pressure drop such as an orifice downstream of the pulse-shaping device, then even though the pop-up pressure of the washer will be unaffected, pulse-shaping may be abruptly lost above some cutoff value of (pop-up pressure / initial pressure) which is well below 90%. It appears that if the rupturable wall 20 had to be downstream of the pulse-shaping valving, then in order for pulse-shaping to be achieved over a wide range of parameters, it would be necessary for the rupturable wall 20 to be much larger than is necessary in the configuration shown in FIG. 3.

The choice of the ratio between always-open area and fully open variable area determines the ratio of the slopes of the gentle-fill and the rapid-fill portions of the transient. If that ratio is chosen to be small, there will be a more dramatic difference or more contrast between the two regions of the transients. If the ratio is larger, the difference will be less dramatic and there will be less contrast between the two regions of the transient. Contrast is what accomplishes the goal of making the early part of the inflation different from (more gentle than) the later part of the transient, but contrast has a cost in terms of overall duration of the transient. For this pulse-shaping invention to work well, it is desirable that if a certain minimum fraction of the gas mass discharge be pulse-shaped, i.e., discharged during the gentle portion of the transient. This minimum fraction is somewhere around 10%. If we deliberately slow down the discharge of at least 10% of the gas, especially if we attempt to have great contrast between the two regions of the transient, the duration of the gentle-fill portion of the transient will be lengthened and this may extend the overall transient until it is too long for the time period of the accident being designed for. This suggests some limitation on the amount of contrast we can have between the two portions of the transient. For cases of practical interest, the ratio of the slope of the rapid-discharge portion to the slope of the gentle-discharge portion is probably in the range of 2 to 5.

It is found that the pop-up pressure depends significantly on the size of the gap (in the absence of force or load) between washer 80 and seat 82. The pop-up pressure in turn influences the duration of the gentle-fill portion of the transient. Dimensional tolerances on the seat elevation and the washer height must be such as to control the gap to within a small fraction of that nominal value. It may be advantageous that seat 82 be located at the same elevation as support ledge 81, if the washer is manufactured with an appropriate initial height. This eliminates one dimension and leaves only the washer itself (which is a stamping) requiring close tolerances.

EMBODIMENT 2

Figure 4:
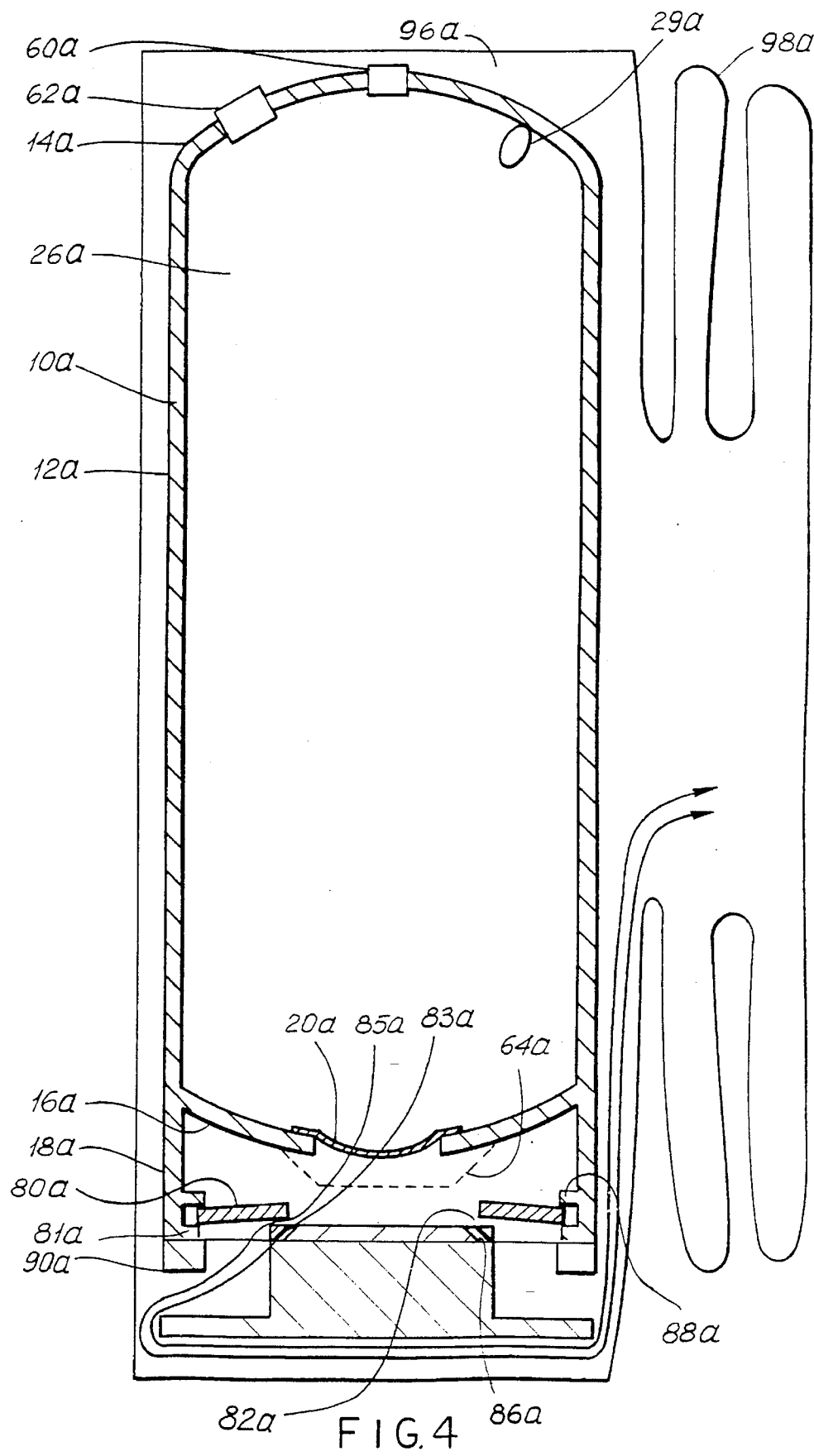
FIG. 4 is a similar view of an alternate embodiment.

This embodiment is similar to embodiment 1, except for an interchanging of the functions of the two edges of the washer. It is shown in FIG. 4, with like parts being similarly numbered with subscript "a".

In this embodiment, washer 80*a* is structurally supported at its outer circumference, with the inner circumference being free to move upon action of pressure difference. Gas can flow under the movable inner edge of washer 80*a*, but no path is provided for flow of gas under the outer supported edge of washer 80*a*. Washer 80*a* is structurally supported by support ledge 81*a* which is in turn structurally connected to bridge structure 90*a* which is in turn structurally connected to skirt 18. A retainer feature 88*a* may be provided as in the previous embodiment. If washer 80*a* is a Belleville washer, it may be preferable for the washer to be mounted so that the action of the pressure difference during the inflation transient tends to push the washer back into plane, flatter than when it is unloaded. This configuration may be referred to as a uniflow right side up configuration.

Seat 82*a* must be provided, as in the previous embodiment, such that pressure caused by the rupture of rupturable wall 20 pushes the movable edge of washer 80*a* toward seat 82*a* and washer 80*a* can touch seat 82*a* if washer 80*a* is appropriately loaded, and at least some of the flow must pass between seat 82*a* and the nearby edge or surface of washer 80*a* so that the gap between seat 82*a* and the nearby edge or surface of washer 80*a* constituting a valving action.

As in the previous embodiment, the flow of gas from the region upstream of washer 80*a* to the region downstream of washer 80*a* preferably comprises two somewhat separate and distinct flowpaths: an always-open flowpath 83*a* and a variable-area flowpath 85*a*. Flowpath 83*a* proceeds from the source of gas, through a minimum flow area in flowpath 83*a* which is provided by a constant orifice or orifices whose total flow area is unaffected by motion of washer 80*a*, and thence through the open path in bridge structure 90*a*, and thence into the housing 96 and airbag 98. As in the previous embodiment, the always-open flowpath 83*a* may be provided by castellations 86*a* in seat 82*a* or may be provided by always-open orifice(s) elsewhere. Variable-area flowpath 85*a* proceeds from the source of gas, through a minimum flow area in flowpath 85*a* which is defined by seat 82*a* and the nearby edge or surface of washer 80*a* which faces seat 82*a*, and thence through the open path in bridge structure 90*a*, and thence into the housing 96 and airbag 98. Again, bridge structure 90*a* preferably has a substantial open area to minimize its flow resistance.

The advantage of this geometry, which may be called a right-side-up washer geometry, is that the washer is more inherently stable structurally in that the net resultant load on the washer due to pressure and fluid forces will always be inside the contact periphery (support points) by which the outer circumference of the washer rests against its washer holder or base (bridge structure 90*a*). Also, the structural design of the bridge structure 90*a* is made somewhat easier because the major load is exerted by the outer edge of the washer almost directly onto the skirt 18, resulting in a short load path. The disadvantage of this geometry is that the circumference used for valving is smaller than in embodiment 1, typically by a factor of 2, since that is the ratio of the inner diameter and outer diameter of the Belleville washer. Thus, the valved area is correspondingly smaller and this slows down the time constant of the inflator. It is found that for identical washers with identical gaps, the pop-up pressure is approximately the same whether the geometry is upside-down or right-side up.

EMBODIMENT 3

Figure 5:
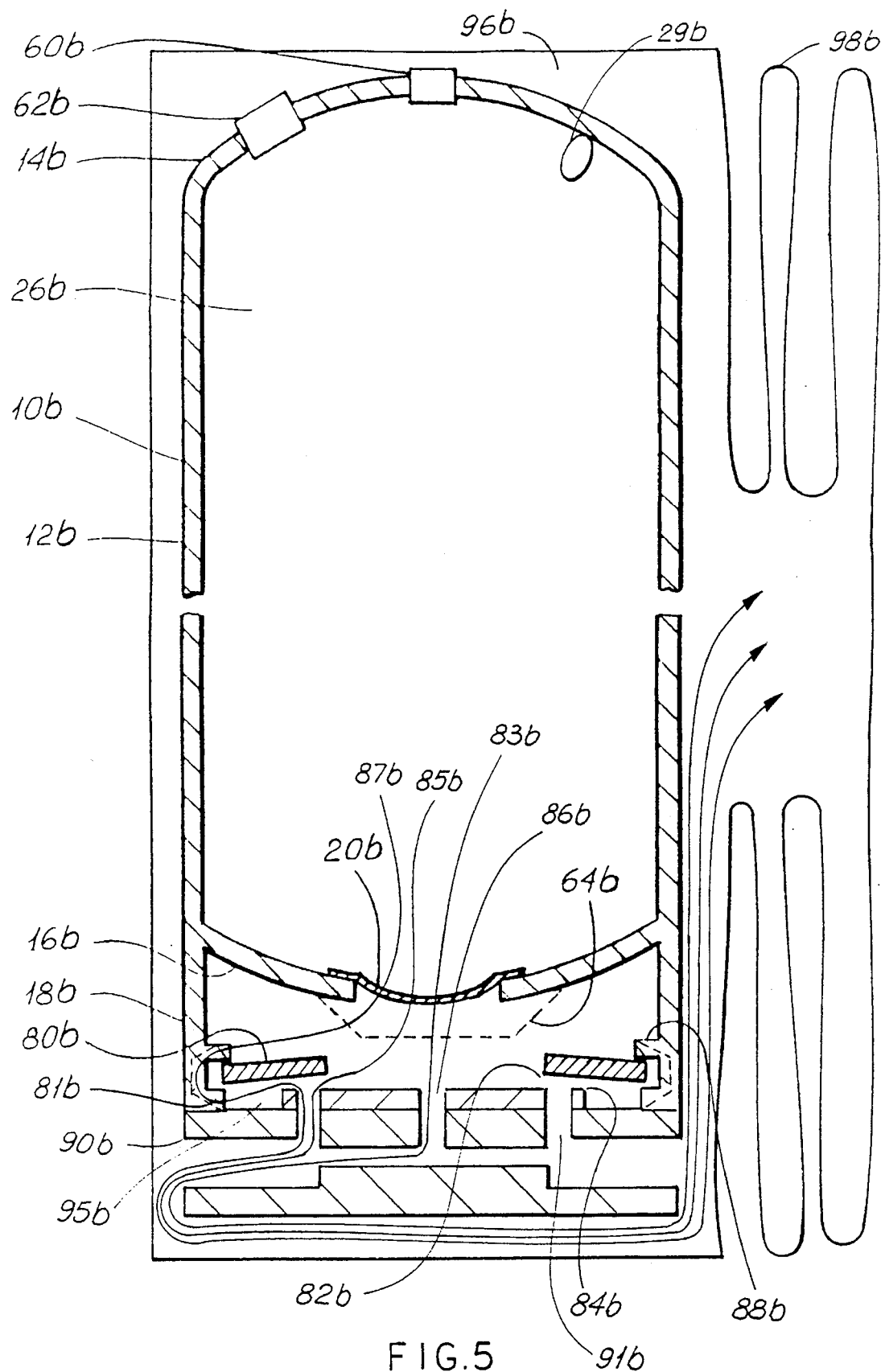
FIG. 5 is a second embodiment.
Figure 5A:
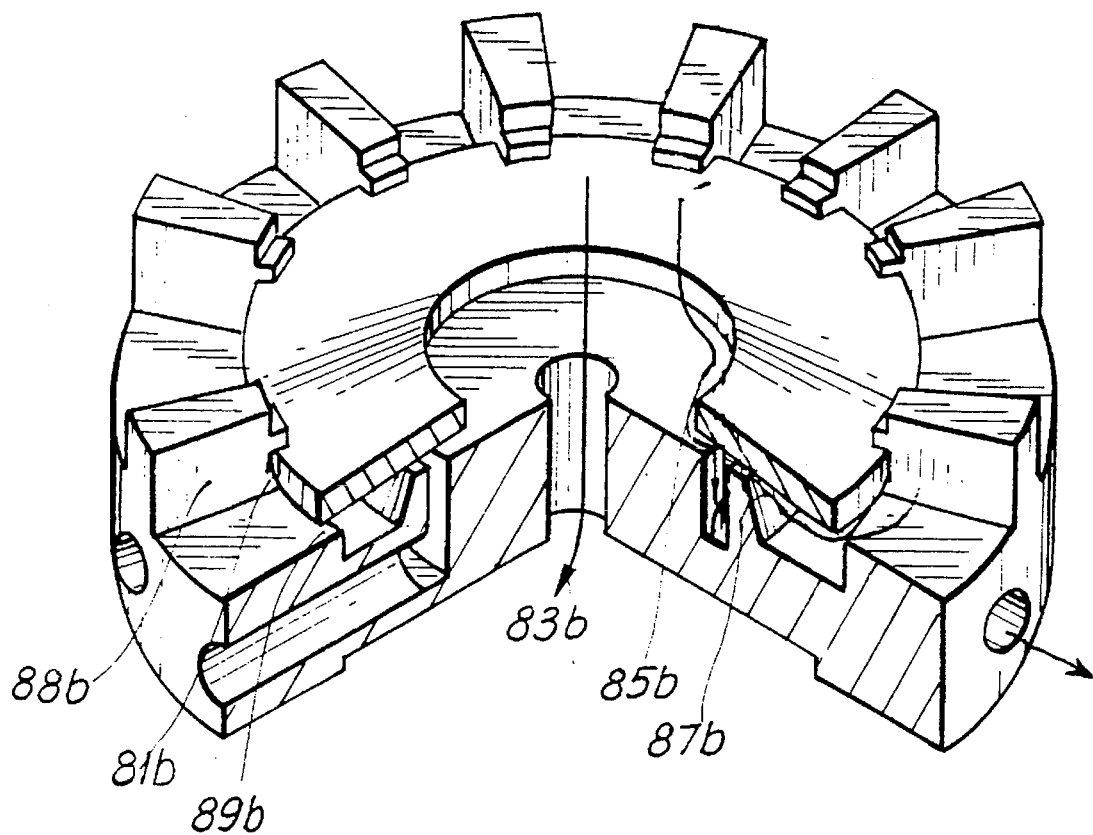
FIG. 5a is an enlarged perspective view showing the slots or castellations of the embodiment of FIG. 5.

So far, in both embodiment 1 and embodiment 2, the edge of the washer which was supported on the support ledge did not have flow under it. There was only one variable-area flowpath and it passed under the movable edge of the washer. Another feature of embodiments 1 and 2 was that almost the whole surface of the washer was exposed to the full pressure difference. Even if the seat were located somewhat inward from the movable edge of the washer in embodiment i or somewhat outward from the movable edge in embodiment 2, there still would be a substantial portion of the washer surface area exposed to the full pressure difference. Embodiments 1 and 2 are useful but they are not the only possible washer holder geometries of interest. Another geometry of interest, embodiment 3, is shown in FIG. 5. Like parts will be similarly numbered with a subscript "b".

In embodiment 3 the outer edge of washer 80*b* is structurally supported on support ledge 81*b* and the inner edge is free to move, and there is flow under both the inner movable edge of the washer and the fixed outer edge of the washer. In order to bring flow under the edge (in this case the outer edge) of the washer 80*b* which is supported by support ledge 81*b*, it is necessary to modify the support surface upon which the outer edge of the washer rests. Here this is shown as being done by providing castellations 89*b* or similar flow paths underneath the edge of the washer 80*b* which allow flow of gas while still providing structural support to the supported edge of the washer 80*b*. Retainer feature 88*b*, which retains the washer, must similarly be configured to leave some flow area open or unblocked to allow establishment of a flowpath around the supported edge of washer 80*b*. If washer 80*b* is a Belleville washer, it may be preferable for the washer to be mounted so that the action of the pressure difference during the inflation transient tends to push the washer back into plane, flatter than when it is unloaded. This configuration, in which there are two directions of flow and a right side up washer, may be referred to as a biflow right side up configuration.

There is one always-open flowpath 83*b* as in the previous embodiments but now there are two (rather than one) variable-area flowpaths, 85*b* and 87*b*. A first variable-area flowpath 85*b*, as previously, passes under the movable edge of washer 80*b*, in this case the inner edge, and then passes between seat 82*b* and the nearby surface or edge of washer 80*b* facing seat 82*b*, as a place of minimum area. In addition, the second variable-area flowpath 87*b* passes under the fixed edge of washer 80*b*, in this case the outer edge. There may then be provided a cavity or manifold 95 region under washer 80*b* so that the flows which passed through the castellations 89*b* may recombine, and then the flow in flowpath 87*b* passes through the valving action formed by seat 84*b* and the nearby edge or surface of washer 80*b*, as a place of minimum area. Flowpaths 85b and 87b then combine and flow together the rest of their flow circuit. In the geometry of this embodiment, the two valving seats 82b and 84b together define a "drain" 91b consisting of the space between them on the downstream side of the washer. As drawn here, this drain may be an annular groove or slot, and flow approaches from both the inward direction (flowpath 85b) and the outward direction (flowpath 87b). The flow is valved because it must pass over one or the other of these valving seats in order to enter the drain, and the flow can be shut off by the underside of the washer touching these seats. In embodiment 2, the valved area was calculated as the circumference of the valve seat, which was roughly the washer inner circumference, times the gap or distance to the nearby edge or surface of the washer. It can be appreciated that in this geometry flowpath 85b provides essentially that same amount of valved flow area based on the seat whose circumference is roughly the washer inner circumference, but it also provides an additional valved flow area in flowpath 87b which is the circumference of the outer valve seat times the gap or distance to the nearby surface of the washer at that location. It turns out that at the outer valve seat which has been added for this embodiment, the circumference is somewhat larger than for the inner valve seat, while the travel distance to the underside of the washer is slightly reduced, resulting in an additional area which is almost as much again as the valved area originally present in embodiment 2. Thus, for an identical washer and gap, this total valved area in this embodiment is almost double the valved area of the similar right-side-up geometry of embodiment 2. Of course, this helps the inflator to discharge more rapidly.

In the previous embodiments, one of the recommendations concerning the flow area for the flowpaths through the bridge structure was that this total flow area be somewhat larger than the total flow area of the pulse-shaping valving device. Similarly, in the sizing of the drain 91b, it is good for the cross-sectional flow area of the drain to be at least somewhat larger than the valved area just calculated. If the effective area of the washer which is subject to the full pressure difference is significantly smaller than the total area of the washer face, it is apparent that the total force or moment acting on the washer should be significantly reduced compared to that in a geometry such as embodiment 1 or embodiment 2. This would be particularly advantageous and even necessary if it is desired to make the washer out of a material with a lower yield strength and/or Young's modulus than those of the high strength steel used in the examples so far. It is found that if an identical washer is placed on a washer holder as in embodiment 2 and a washer holder as in embodiment 3, with identical gap, the pop-up pressure for embodiment 3 is typically more than double that with embodiment 2. Thus, if it is desired to have a pop-up pressure which is roughly that of embodiments 1 and 2, using the same washer inner and outer diameters and the same high strength steel material for the washer, it would be necessary to use a somewhat thinner washer.

The washer thickness is of some particular interest because with this washer thickness and the typical associated dish dimension, the washer behavior can be within a region of nonlinearity in the force-deflection characteristic. The degree of nonlinearity is described by the ratio h/t, where h is the dish dimension of the washer as stamped (the distance by which it is deformed out of plane, when no load is acting on it), and where t is the thickness of the washer. Force-deflection nonlinearity may be useful in tailoring details of the pulse-shaping, such as achieving a sharp break between the gentle-fill and rapid-fill portions of the transient.

All of the description given so far in this embodiment pertains to the valved flow area, flowpaths 85b and 87b. Of course, as in the previous embodiments, it is also necessary to provide an always-open flow area for flowpath 83b. This can be done with a separate always-open orifice 86b, which is the method shown in FIG. 5. Always-open flowpath 83b is shown in FIG. 5 as including a right angle bend so as to exit in a radial direction symmetrically, so as to avoid producing thrust. The always-open flowpath could also be provided, in a way more analogous what was done in embodiments 1 and 2, by means of castellations in one or both of the valve seats 82b and 84b which define the drain. Yet another way of providing the always-open area, which is conceptually the simplest way, is to dimension the elevations of the two valve seats 82b and 84b which define the drain such that when the washer touches or seats against one of the seats 82b or 84b it still leaves a small gap with respect to the other seat 84b or 82b. The area of this small remaining gap would constitute the always-open flowpath 83b.

In sizing the castellations 89b, which conduct flow under support ledge 81b, it is desirable to avoid making the castellations a significant pressure drop in flowpath 87b. Thus, it would be appropriate to make the total flow area of castellations 89b roughly equal to or somewhat greater than the valved flow area formed by the valving action of seat 84b and the nearby surface of washer 80b. Adequate structural support of the outer edge of washer 80b can be assured by achieving the flow area through appropriate depth of castellation so as to leave sufficient remaining circumference of the support ledge 81b, and by making the castellations sufficiently numerous so that each individual unsupported span is sufficiently short.

EMBODIMENT 4

Figure 6:
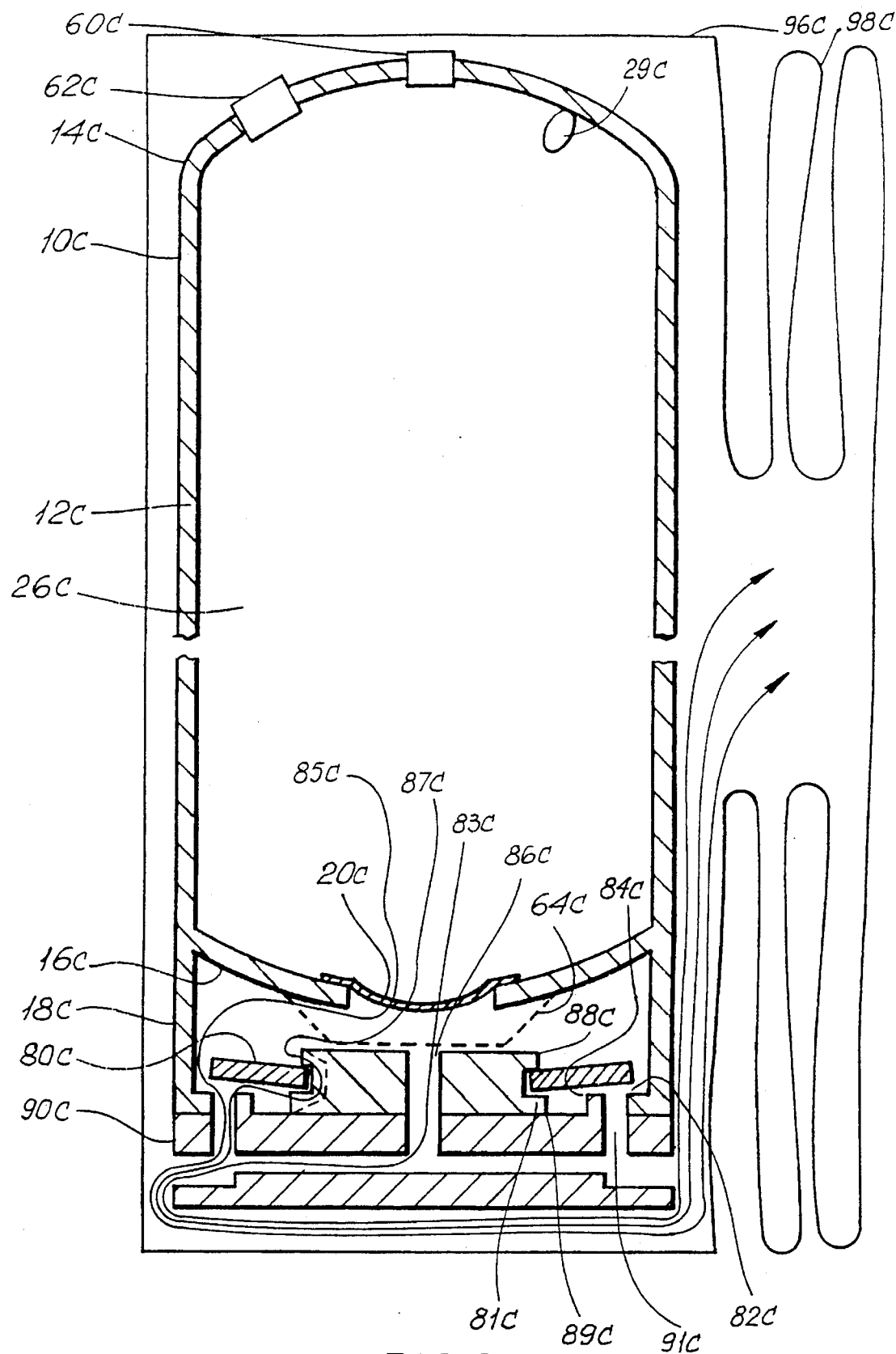
FIG. 6 is a third embodiment.

Embodiment 4 is similar to embodiment 3, except for an interchanging of the functions of the two edges of the washer. It is shown in FIG. 6, with like parts being similarly numbered with subscript "c".

The feature of providing a flowpath for gas flow under the structurally supported edge of the washer, which was introduced in embodiment 3, is continued in embodiment 4, with the structurally supported edge of washer 80c being the inner edge, and the edge which is free to move being the outer edge. The inner edge of washer 80c is structurally supported on support ledge 81c which contains castellations or similar flow passageways 89c. As in the previous embodiment, retainer feature 88c, which retains the washer, must similarly be configured to leave some flow area open or unblocked to allow establishment of a flowpath around the supported edge of washer 80c. If washer 80c is a Belleville washer, it may be preferable for the washer to be mounted so that the action of the pressure difference during the inflation transient tends to push the washer back into plane, flatter than when it is unloaded. This configuration may be referred to as a biflow upside-down configuration.

As in embodiment 3, there is one always-open flowpath 83c and two variable-area flowpaths, 85c and 87c. The first variable-area flowpath 85c, passes under the movable edge of washer 80c, in this case the outer edge, and then passes between seat 82c and the nearby surface or edge of washer 80c facing seat 82c, as a place of minimum area. The second variable-area flowpath 87c passes under the fixed edge of washer 80c, in this case the inner edge. There may then be provided a cavity or manifold region under washer 80c so that the flows which passed through the castellations 89c may recombine, and then the flow in flowpath 87c passes through the valving action formed by seat 84c and the nearby edge or surface of washer 80c, as a place of minimum area. Flowpaths 85c and 87c then combine and flow together the rest of their flow circuit. In the geometry of this embodiment, just as in the previous embodiment, the two valving seats 82c and 84c together define a "drain" 91c consisting of the space between them on the downstream side of the washer, which may be an annular groove or slot, and flow approaches from both the outward direction (flowpath 85c) and the inward direction (flowpath 87c).

It can be appreciated that flowpath 85c of this geometry provides essentially the same amount of valved flow area as embodiment 1, based on the seat whose circumference is roughly the washer outer circumference, but flowpath 87c also provides some additional valved flow area which is the circumference of the inner valve seat times the gap or distance to the nearby surface of the washer at that location. At the inner valve seat which provides the additional flow area compared to embodiment 1, the circumference is somewhat smaller than for the outer valve seat, and the travel distance to the underside of the washer is also reduced. Thus, the additional valved area gained in comparison with embodiment 1 would only be somewhere around 50%.

The recommendations as far as sizing the flow area of the drain as given in the discussion of the previous embodiment also apply here, so the drain size should be similar or only slightly larger. Just as in the previous embodiment, the effective area of the washer which is subject to the full pressure difference is significantly smaller than the total area of the washer face, and so the total force or moment acting on the Belleville washer should be significantly reduced compared to that in a geometry such as embodiment 1 or embodiment 2. Again, to obtain a similar pop-up pressure, the thickness of an otherwise identical washer would be reduced compared to embodiment 1. The always-open flow area for flowpath 83c can be provided by always-open orifice 86c in a manner similar to that described for embodiment 3. The castellations 89c, which conduct flow under support ledge 81c, would also be sized as described under embodiment 3.

The principal advantage of embodiment 4 over embodiment 3 is the somewhat larger valved flow area, although the improvement is only about 50%.

EMBODIMENT 5

The preceding embodiments were designed to operate at essentially just one peak value of the pressure difference which acts across the pulse-shaping device during the transient, or at worst only a narrow band of such values. However, this is not necessarily true for all types of inflators. One inflator technology of interest is stored gas, for which no combustion is involved in generating or heating the gas which is to fill the airbag. As has been discussed earlier, in a stored gas inflator of the type envisioned here, it is preferable that the stored gas be helium or a mixture comprising a substantial fraction of helium, because of the large speed of sound. For stored gas, the wide temperature range typically required for inflators to operate in (−40° C. to +90° C.) means that there will be a substantial variation in the pressure of the stored gas and hence the pressure difference upon which the pulse-shaping device must act. This means that if a pulse-shaping mechanism as described in the first four embodiments were configured so that at cold conditions it provided an appropriate amount of pulse-shaping, at hot conditions the gentle-fill portion of the transient would be protracted far too long, maybe even beyond the end of the crash. Conversely, if the pulse-shaping mechanism were configured to provide appropriate pulse-shaping at hot conditions, it would fail to pulse-shape at all at cold conditions. Consequently, a self-adjusting mechanism must be provided, and in these next several embodiments self-adjustment is built into the deformable washer by means of the technology of bimetallic layered material.

Figure 7:
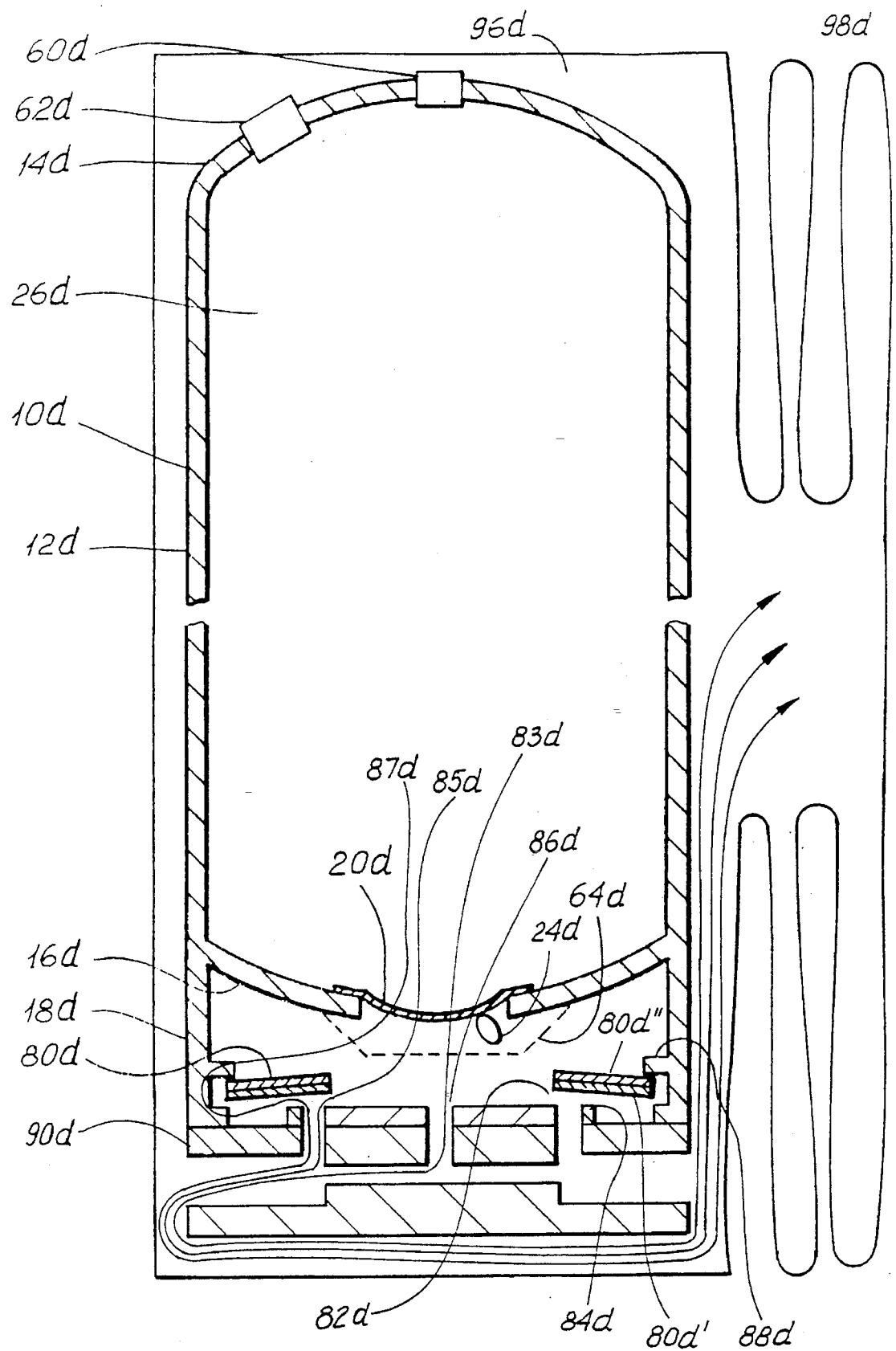
FIG. 7 is a fourth embodiment.

This embodiment is shown in FIG. 7, with like parts being similarly numbered with a subscript "d". Similar to earlier embodiments, it comprises a generally cylindrical pressure vessel 10d, which comprises a cylindrical portion 12d, a semi-ellipsoidal or hemispherical end cap 14d away from the discharge end and an end cap 16d containing an orifice which is disposed to receive a rupture wall 20d. In a stored gas inflator, the rupturable wall 20d such as a rupture disc is caused to rupture upon command resulting from a crash sensor, allowing the gas flow to start suddenly. This requires an initiating means for inducing rupture (24d). Means for inducing rupture are known in the art and would most commonly be of a pyrotechnic nature. These means for inducing rupture could be mounted either on the outside (atmospheric) side of the rupturable wall 20d, or on the inside with provision of an electrically insulated feedthrough through the pressure boundary for the purpose of bringing the electrical signal to the initiating means. The illustrations here show the pyrotechnic 24d mounted on the outside of rupturable wall 20d. The pyrotechnic typically would, by its very localized and brief high pressure pulse, blow a hole in the rupture disc. The pyrotechnic could cause this damage in a single place, which might be followed by further tearing of the disc due to the pressure difference. The pyrotechnic could also be arranged to cause damage around a substantial fraction of the outer periphery of the rupture disc, which might be followed by something more resembling shearing out of a portion of the disc by the force due to pressure difference. Either of these techniques could include the use of so-called shaped charge explosives. The present invention also contemplates puncturing type devices for rupturing rupturable wall 20d. As a secondary function, the rupturable wall 20d would also function as a passive overpressure protection device as is its common use in pressure vessel and process equipment.

This embodiment corresponds to embodiment 3, in which the washer 80d is mounted in its right-side-up position and there is flow under both edges of the washer. For a washer made of the bimetallic material described herein, whose yield strength and Young's modulus are both smaller than those of the high strength steel used for commercial Belleville washers, it is advantageous to use a washer holder geometry with flow under both edges of the washer and with flow exiting into a drain, as in embodiment 3 (or 4), so that less of the washer surface is exposed to the full pressure difference. In this embodiment, washer 80d, support ledge 81d, retainer feature 88d, valve seats 82d and 84d, flowpaths 83d, 85d and 87d, always-open orifice 86d and castellations 89d all have the same design as in embodiment 3. In this embodiment, deformable washer 80d is shown as being made of a bimetallic layered material containing a low expansion side 80d' and a high expansion side 80d". This configuration may be referred to as a bimetallic, biflow, right side up configuration.

Bimetals consist of two metal alloys having different coefficients of thermal expansion, metallurgically bonded to each other. As a result of changes of temperature the material generates within itself a bending moment, which results in either deflection or force or both, depending on constraint conditions. Bimetals are widely used in thermometers, thermostats and over temperature protection devices. The washer may be made of the bimetal combination designated as TM1 by the American Society for Testing and Materials. In this bimetal combination the high expansion material has the composition 22% Ni, 3% Cr, balance Fe. The low expansion material, sometimes referred to as Invar, has the composition 36% Ni, balance Fe. The material is obtainable in the required dimensions and preferably in a hard (cold-worked) condition from Polymetallurgical Corporation, in North Attleboro Mass. The responsiveness of a bimetal combination to temperature is described by a quantity called the flexivity, whose value for this bimetal combination is 140E-7 /F in the temperature range of interest here. The washer dimensions would be the same as in earlier embodiments. According to formulas given in the literature of bimetals, a flat annular disc made of bimetal deflects as a function of temperature according to deflection=$0.106*\text{Flexivity}*\text{deltaT}*(D^2-d^2)/t$, where D is the outside diameter, d is the inside diameter, and t is the thickness, with all of these dimensions and the deflection being measured in inches; deltaT is the temperature excursion in Fahrenheit; and Flexivity is in units of 1/Fahrenheit. The motion is used to adjust the initial position of the washer, and more specifically the gap between the seats and the valving surfaces, as a function of the initial temperature of the washer prior to the inflation. When the initial temperature is high (and the stored gas pressure is also high), the gap between the washer 80d and seats 82d and 84d must be relatively larger, and when the initial temperature is cold (and the stored gas pressure is low), the gap must be relatively smaller. For this to occur, the proper bimetal orientation is to have the low expansion side 80d' of the bimetallic washer facing the valving seats 82d and 84d and the high expansion side 80d" of the bimetallic washer facing away from seats 82d and 84d.

This embodiment and the next several embodiments assume that the bimetallic Belleville washer will set its position based on the initial temperature of the inflator prior to actuation, and the behavior of the washer throughout the transient will be determined by that setting. In other words, it implicitly assumes that the washer does not change its temperature during the transient. Somewhat less precisely, the operation of a temperature-responsive washer or other pulse-shaping device can probably also be understood by thinking that the washer does not change its temperature by any significant amount during the portion of the transient when washer behavior is most important. The most important time of washer operation is at the very beginning of the discharge, so there is relatively less chance for the washer to change its temperature during that portion of the transient because at first the temperature of the exiting gas is relatively close to the initial stored temperature, with significant cooling of the gas by decompression taking place only during the later part of the transient. Also, at the beginning of the discharge when washer behavior is most important, there has been even less time for heat transfer to take place. Finally, even if there is some change of washer temperature during the important early portion of the transient, the amounts of such temperature change are probably roughly consistent in all cases whatever the initial temperature.

If less temperature-dependent motion is desired, as perhaps for some other inflator technology with a different dependence on temperature, bimetal motion can easily be decreased by using less thermally active alloy combinations or by varying the thickness ratio of the layers away from the approximately 50%—50% usually used, to a more unbalanced ratio.

EMBODIMENT 6

Figure 8:
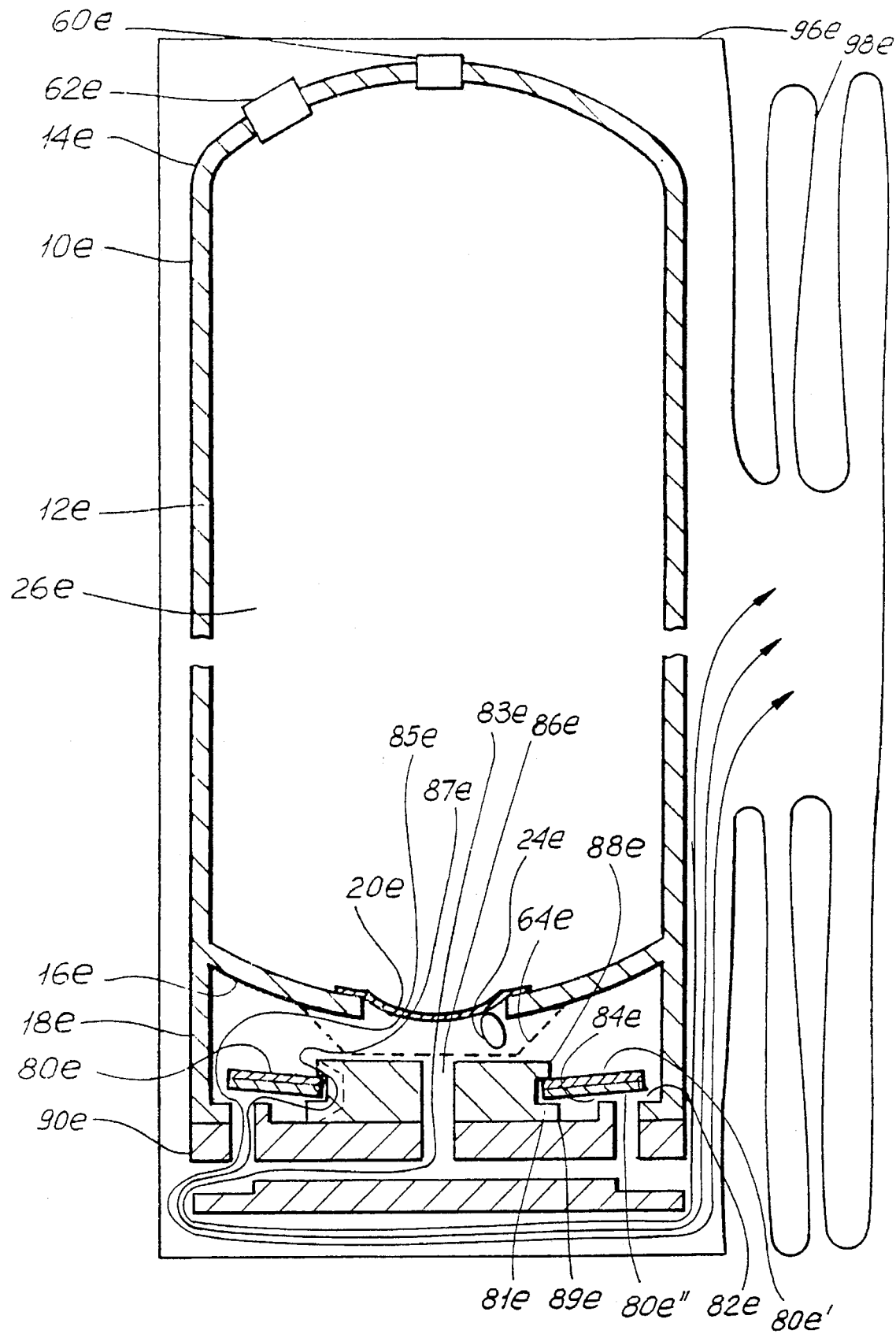
FIG. 8 is a fifth embodiment.

This embodiment corresponds to embodiment 4, again with the change that the washer is a bimetallic washer to provide adjustment of the washer initial position as a function of temperature. This is shown in FIG. 8, with like parts being similarly numbered with a subscript "e". All parts are identical with those in embodiment 4, except that the washer 80e is modified by having the additional feature of two separate layers, a low expansion side 80e' and a high expansion side 80e". This configuration may be referred to as a bimetallic, biflow, upside down configuration. In this embodiment, for self-adjustment to occur in the proper direction, i.e., a larger gap at high initial temperature and a smaller gap at cold initial temperature, the proper bimetal orientation is to have the high expansion side 80e" of the bimetallic washer facing the valving seats 82e and 84e.

EMBODIMENT 7

Figure 9:
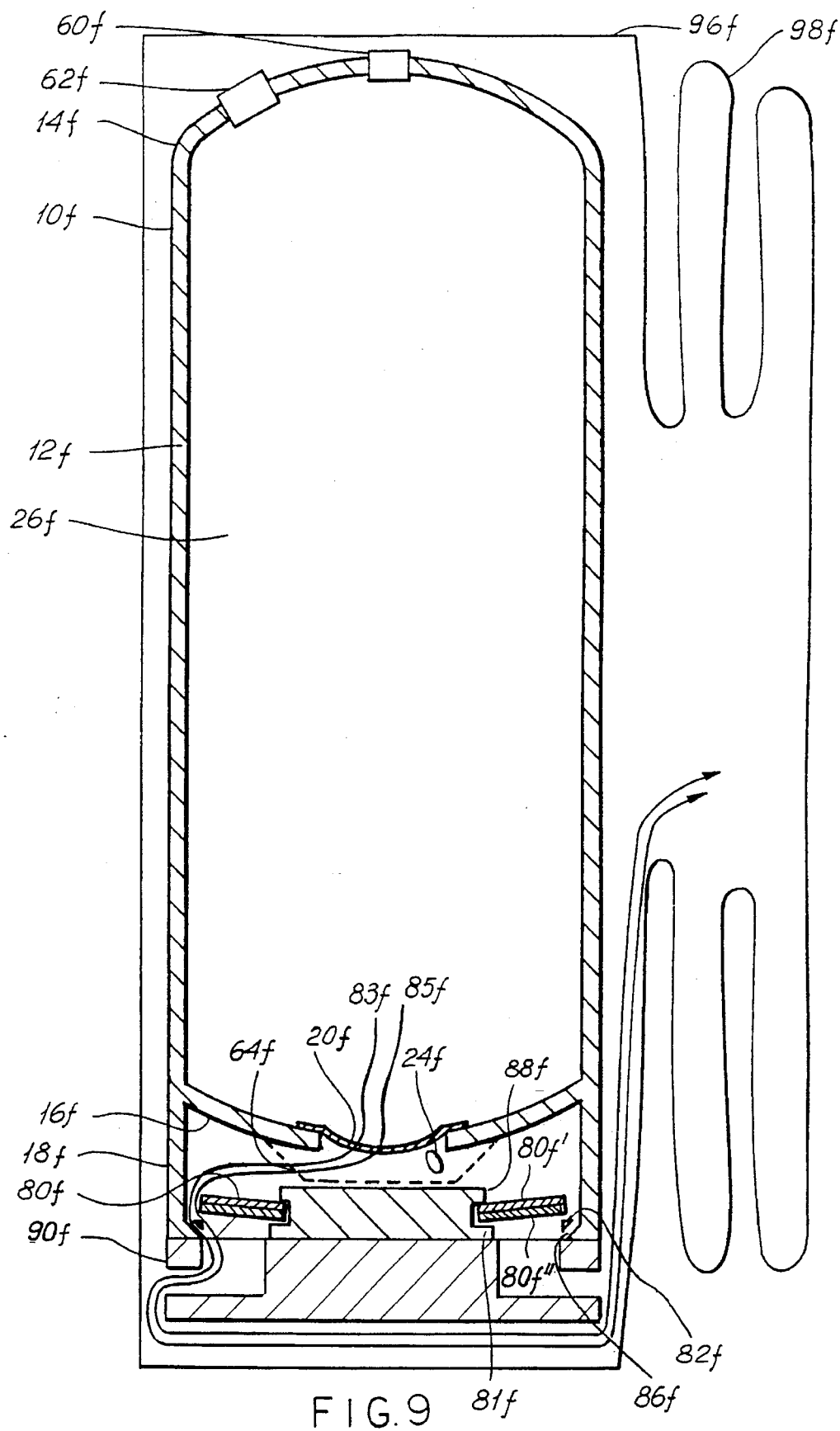
FIG. 9 is a sixth embodiment.

This embodiment corresponds to embodiment 1, with the change that the washer is a bimetallic washer to provide adjustment of the washer initial position as a function of temperature. This is shown in FIG. 9, with like parts being similarly numbered with a subscript "f". All parts are identical with those in embodiment 1, except that the washer 80f is modified by having the additional feature of two separate layers, a low expansion side 80f' and a high expansion side 80f". This configuration may be referred to as a bimetallic, uniflow, upside down configuration. In this embodiment, for self-adjustment to occur in the proper direction, i.e., a larger gap at high initial temperature and a smaller gap at cold initial temperature, the proper bimetal orientation is to have the high expansion side 80f" of the bimetallic washer facing the valving seats 82f and 84f. Because a bimetallic washer of identical dimensions would not be as stiff or as strong as the high strength steel washer used in embodiment 1, this embodiment would probably use slightly different parameter settings such a lower storage pressure.

EMBODIMENT 8

Figure 10:
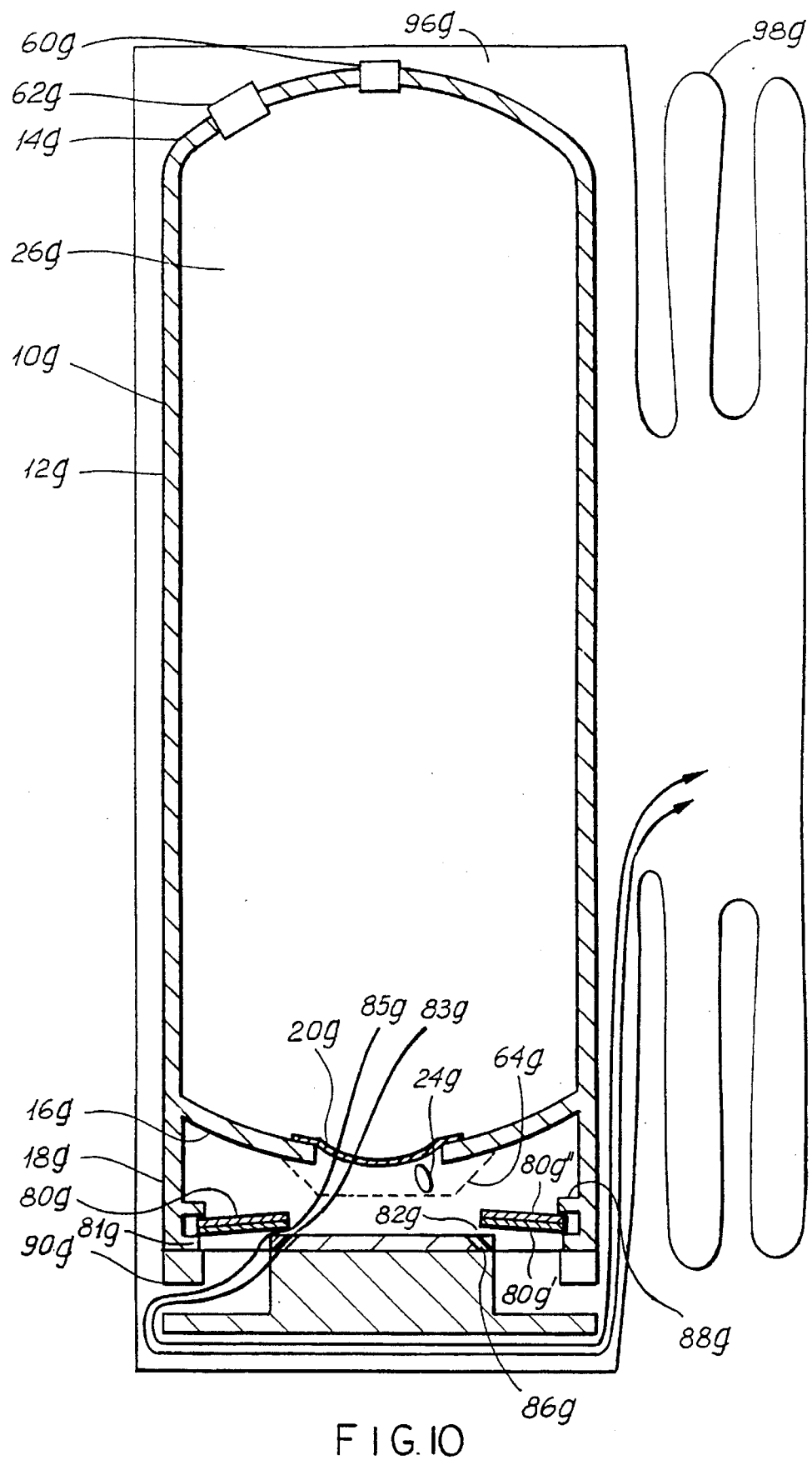
FIG. 10 is a seventh embodiment.

This embodiment corresponds to embodiment 2, with the change that the washer is a bimetallic washer to provide adjustment of the washer initial position as a function of temperature. This is shown in FIG. 10, with like parts being similarly numbered with a subscript "g". All parts are identical with those in embodiment 2, except that the washer 80g is modified by having the additional feature of two separate layers, a low expansion side 80g' and a high expansion side 80g". This configuration may be referred to as a bimetallic, uniflow, right side up configuration. In this embodiment, for self-adjustment to occur in the proper direction, i.e., a larger gap at high initial temperature and a smaller gap at cold initial temperature, the proper bimetal orientation is to have the low expansion side 80g' of the bimetallic washer facing the valving seats 82g and 84g. Because a bimetallic washer of identical dimensions would not be as stiff or as strong as the high strength steel washer used in embodiment 2, this embodiment would probably use slightly different parameter settings such a lower storage pressure.

All of the embodiments so far have used valving surfaces which are circular, such that the available valved area is given by the product of the gap and the circular circumference. As mentioned, in airbag work it is frequently a challenge to achieve a sufficiently rapid discharge of the inflator, and so it may be desirable to provide even more valved area than available from embodiments with circular seats. One way to enlarge the valved area (given possible limitations on overall inflator and washer dimensions and possible limitations on gap dimension) is to enlarge the effective circumference of the valve seat. This can be done by making the valve seat serpentine.

In such a case, with practical assumptions for minimum dimensions related to the canals, it is possible for the total perimeter of the seat to be two or more times the perimeter of the simple circular seat of embodiment 1 and for the valved flow area also to be larger than the valved area for a simple circular seat such as embodiment 1.

What is also required for the serpentine seat to work is that all local flow areas leading up to and leading away from the minimum flow area at the valve seat be larger than the minimum flow area at the valve seat.

It can be appreciated that this contouring of the seat can be used with essentially any washer holder geometry or washer orientation, not just this example from embodiment 1. This technique can be used either with a single-material washer to operate at essentially a single value of pressure difference, or with a bimetallic washer so as to adjust itself for pressure variations due to variations in ambient temperature.

In all of the embodiments so far, the valve seats have closed on themselves making a continuous loop, so essentially there has been only one drain, i.e., downstream of the valve seat there has been only one distinguishable flowpath, within which all the flow was contiguous with itself, not separated by any physical boundaries. It is also possible to have multiple individual drains. This technique can be used either with a single-material washer to operate at essentially a single value of pressure difference, or with a bimetallic washer so as to adjust itself for pressure variations due to variations in ambient temperature.

EMBODIMENT 9

Figure 11:
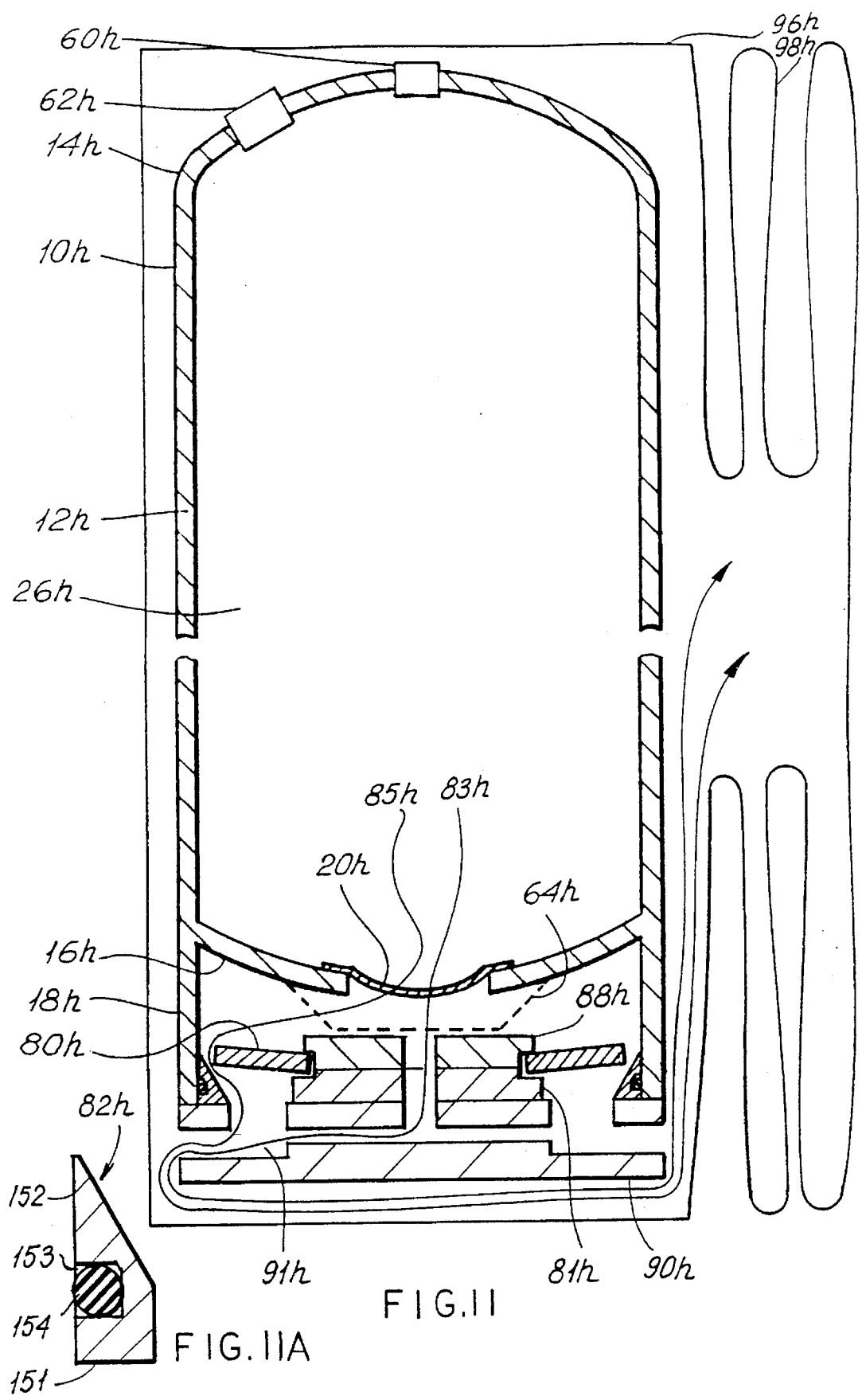
FIG. 11 is an eighth embodiment which incorporates variation of the seat position instead of the washer position as a function of temperature.

So far, of the embodiments which provide self-adjustment as a function of initial temperature, all have used bimetal for the washer. This embodiment 9 accomplishes self-adjustment in an alternative way. In general, what really must be adjusted as a function of initial temperature is the gap between the washer and the seat, so that the force or pressure difference necessary to attain contact between the seat and the washer is kept in the desired relation with the pressure existing inside the gas storage vessel. It really does not matter if the washer height or the seat position is what is adjusted, as long as the gap between them is appropriate. Here, the washer is a standard washer whose height remains constant with respect to temperature, and this embodiment there is an adjustment of the position of the seat against which the washer bears. The seat position is adjusted by means of direct thermal expansion. This is shown in FIG. 11, with like parts being similarly numbered with a subscript "h". This is shown as corresponding to embodiment 1.

Similar to embodiment 1, this embodiment includes a washer 80h which is supported on its inner edge by support ledge 81h, with its outer edge being free to move. Washer 80h is retained by retainer feature 88h. An always-open flowpath 83h and a variable-area flowpath 85h are provided. The always-open flowpath 83h is shown here as having its minimum flow area provided by means of a separate orifice 86h which for convenience is shown located at the axis of the generally cylindrical inflator and thence exiting radially. The minimum flow area in flowpath 85h is defined by the space between the outer edge of washer 80h and seat 82h. The seating surface 82h is one surface of the entity which may be referred to as the thermal expansion seat ring 150.

In order to obtain substantial thermal motion by direct thermal expansion, it is necessary to use a material with as large a coefficient of thermal expansion as possible. It is really more proper to speak of differential thermal expansion, because while the part of interest (made of a material with a relatively large thermal expansion coefficient) undergoes desired thermal expansion, all related parts would also have some intrinsic thermal expansion. The related parts would all be made of some metal and this makes it desirable that the adjustment of the seat position be done by means of a plastic moving with respect to a metal. Some plastics have thermal expansion coefficients significantly larger than those of the common metals, and specifically, a good candidate plastic is polytetrafluoroethylene (Teflon), which has one of the largest thermal expansion coefficients. In order to obtain the desired thermal motion directly by thermal expansion, it is also necessary to provide an appropriate amount of baseline dimension or length of material which can expand, since thermal motion is proportional to both thermal expansion coefficient and baseline length.

There are two principal possibilities for the direction of the base distance, axial and radial. It can be appreciated that conversion of radial motion into axial effect will involve an angle, specifically that the seat surface needs to be sloped. It can be appreciated that the angle will be in the range of 45 degrees. More specifically, this is an angle of seat surface such that, with a washer whose inner edge is supported and whose outer edge is movable and whose outer edge moves away from the pressure vessel under action of pressure difference, and wherein at hot conditions we need a larger gap between the washer outer edge and the seat surface (and a smaller gap at cold conditions), and the seat moves radially outward with increasing temperature, the seat surface wants to be at a radially smaller location further from the pressure vessel end and a radially larger distance closer to the pressure vessel end. The orientation is as shown in FIG. 11. It can be appreciated that the angle of the seat provides some design flexibility in terms of how much axial adjustment of contact point results from a given amount of radial thermal growth. It can be appreciated also that the valving will take place between one of the outer edges of the washer and the generally conical seat surface. This is in contrast to the earlier embodiments where the valving generally took place against a surface, rather than an edge, of the washer.

As shown in FIG. 11, the thermal expansion seat ring 150, which is made of the high thermal expansion material such as polytetrafluoroethylene, is essentially a ring with a somewhat detailed cross-section. First of all, it may be a ring with an empty central region, as shown in FIG. 11, rather than a disc whose center is at least partly filled. Solid mechanics tells us that the change of radius due to thermal expansion is the same for a disc and a ring, assuming of course that both items have the same outside diameter and material properties and temperature excursion. This means that it is quite permissible for the center of the thermal expansion seat ring to be empty. This is helpful because much of that space needs to be used for empty area for flow passageways and for other design features for supporting the washer. Thermal expansion seat ring 150 comprises seating surface 82h, which is disposed at an angle to the other surfaces of the thermal expansion seat ring. It also comprises an outer cylindrical surface 152 into which there may be cut a groove 153 for O-ring 154. The flat bottom surface 151 of thermal expansion seat ring 150 rests on a corresponding flat surface of bridge structure 90h.

The O-ring 154 which surrounds thermal expansion seat ring 150 would be typical of that used as seals in many fluid applications. An O-ring, which is usually made of a polymeric material, is essentially a toroid whose minor diameter is usually much smaller than its major diameter. When used for sealing, an O-ring is usually contained in a groove which is closed over by a mating surface, and it is squeezed so that its cross-section becomes non-circular. The initial squeeze helps to maintain the seal. In this situation the O-ring serves the function of a seal so that only the intended flowpaths 83h and 85h are available to the exiting gas.

This thermal expansion seat ring 150 needs to be kept centered as it thermally expands and contracts, so that its axis essentially coincides with the axis of the washer. In general, this could be done by any type of spring device which is disposed in an axisymmetric manner. The centering or locating of the ring in its plane is shown as being done from the outside of the ring, with the center of the ring being completely open. In the design shown here, the O-ring which was introduced for sealing purposes also serves the purpose of a centering device. The O-ring will simply have more squeeze (compression) at higher temperatures and less at low temperatures. The O-ring in this geometry always has complete symmetry with respect to the cylindrical geometry, so it must keep the thermal expansion seat ring aligned with the principal cylindrical axis. At the same time, the force which it exerts on the thermal expansion seat ring should be relatively small, and the resulting stresses should be relatively modest, so that there does would not result any worry about long-term creep of the plastic (such as polytetrafluoroethylene).

A significant consideration in the design of a thermal expansion seat ring is the load acting on it during the discharge transient, because the plastic material it is likely to be made from, such as polytetrafluoroethylene, is generally not as strong as metals. Thus, some consideration has been given to the reaction and balancing of forces that might act on the thermal expansion seat ring. There are both axial and radial fluid forces to consider. In terms of axial fluid forces, the thermal expansion seat ring preferably has its flat bottom surface 151 sitting on another flat surface which provides support to react axial forces. Since the relatively small flow area between the washer edge and the nearby thermal expansion seat ring will be the largest pressure drop in the inflator, the upper surfaces of the thermal expansion seat ring 150 will have a large pressure acting on them and the lower surface (where it rests on the flat surface) will be in a region of much lower pressure. This will create substantial axial forces but they will all be reacted directly on a good support surface. The net axial force on the thermal expansion seat ring which results from this pressure difference is potentially useful in that it can create a friction force which will resist motion in the radial direction due to unbalanced forces in the radial direction or due to force exerted by the movable edge of the washer when it touches the seating surface.

Possible force in the radial direction arises from the fact that the portion of the slanted surface of thermal expansion seat ring which is downstream of the minimum area formed by the outer edge of washer 80h and nearby seat is exposed to a relatively low pressure. On the other hand, depending on the axial location of the O-ring, some portion of the outside cylindrical surface of the thermal expansion seat ring, just as its top surface, can be exposed to the relatively large upstream pressure. The key to balancing these forces lies in the axial positioning of the O-ring groove on the outer circumference of the thermal expansion seat ring, and fortunately the axial positioning has a great deal of design freedom. This is yet another important function for the O-ring. If the O-ring groove is appropriately positioned, it should be possible to balance the radial forces quite closely, resulting in little net inward or outward (radial) force due to differences in fluid pressure. Practically speaking, this means that the axial location where the O-ring forms the seal and creates a boundary between the high and low pressure regions should be approximately the same as the axial location of the location where the washer edge touches the thermal expansion seat ring if pressed sufficiently hard.

EMBODIMENT 10

Figure 12:
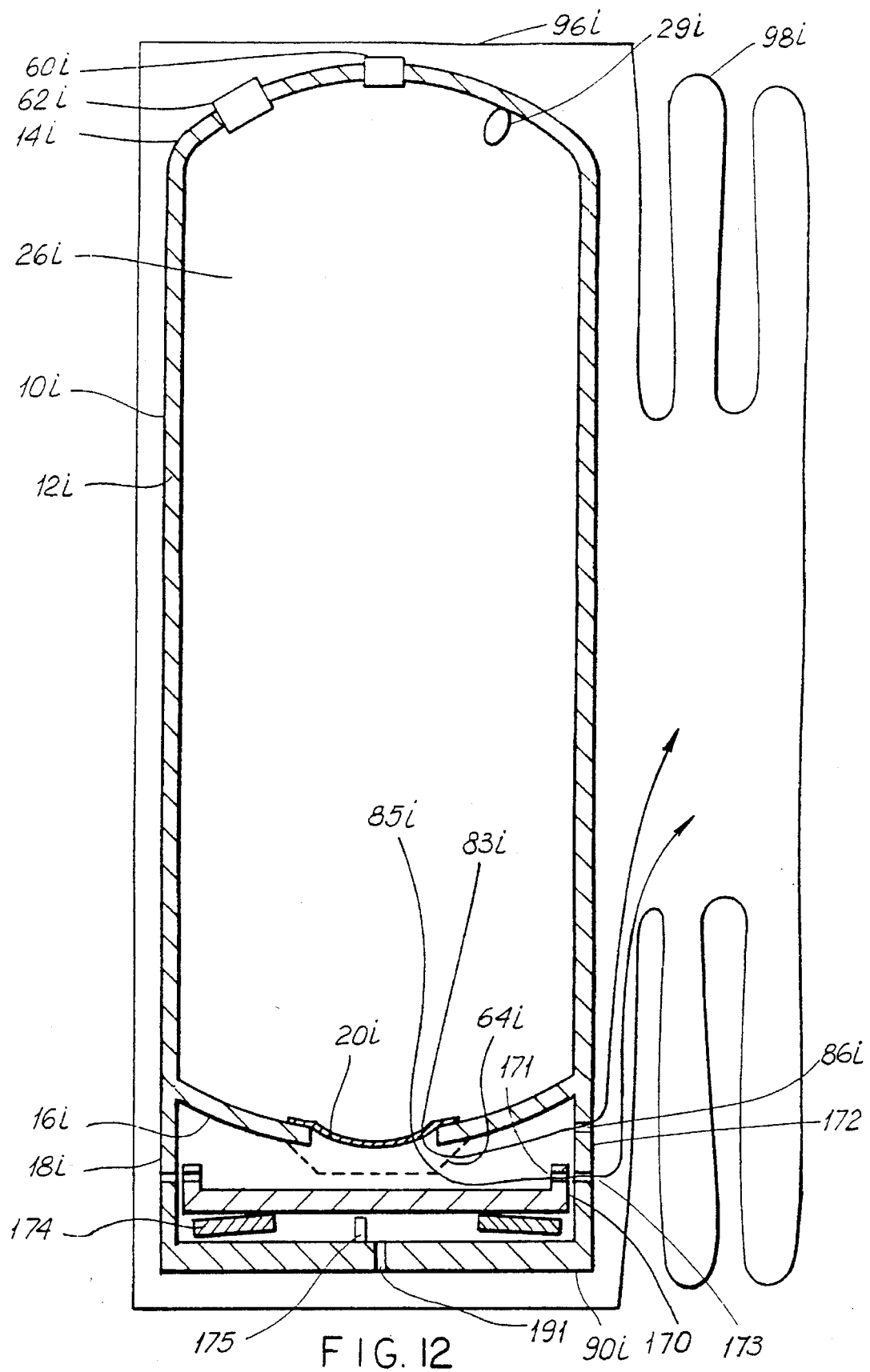
FIG. 12 is a ninth embodiment.

All of the preceding embodiments have used the Belleville washer to perform both the spring function and also the valving function. This has significant advantages for reducing the number of parts and for simplicity of design. However, it is also possible to separate these two functions, so as to have the spring as one separate part and have another separate part, perhaps resembling a piston, perform the valving by means of sliding motion which covers or uncovers slots. This is shown in FIG. 12, with like parts being similarly numbered with a subscript "i". Just as embodiments 1 through 4, this embodiment is designed to operate at only a single value of peak pressure difference.

This embodiment may comprise pressure vessel 10' comprising cylindrical region 12i, closed end dome 14i and end dome 16i which comprises a rupturable wall 20i, and skirt 18i. It may further comprise combustible means 26i, igniting device 29i, fill and seal port 60i, pressure monitor or sensor, 62i, and fragment catcher 64i. Interior to skirt 18i is cylinder 172 which is closely fitting with piston 170, disposed so that fluid forces act on piston 170 when the rupturable wall 20i is ruptured. Reacting the forces from the piston 170 is spring 174, which transmits those forces to end cap or bridge structure 90i which thence transmits those forces to skirt 18i. Disposed in piston 170 are slots 171, and disposed in cylinder 172 are slots 173, disposed in desired locations so as to provide a valving effect depending on the relative position of the piston and cylinder. Piston 170 preferably comprises a hollow portion near the slots 171 to provide access for the gas. Previous embodiments provided always-open flowpath 83i and valved flowpath 85i. Always-open flowpath 83i may be provided through always-open hole(s) 86i. There may also be provided a bottoming or stop device 175 such that when the piston 170 deflects to a certain position, it touches and bears against the bottoming or stop device and does not move further. Bridge structure 90i may have in it bleed hole 191 or similar hole(s) so that there is not created a pressure rise between bridge structure 90i and the facing surface of piston 170 when piston 170 changes position, or due to possible leakage of gas through the gap between piston 170 and cylinder 172.

In this embodiment, the spring 174 which provides the reaction force for the movable piston could be any general type of spring. It could be a Belleville washer as used for previous embodiments, but it could instead be a coil spring, a leaf spring or any other kind of spring. It could also be combinations of Belleville washers in series or in parallel or both. Possibilities such as these might provide greater distance of motion, which helps in achieving sufficient valved area and sufficiently rapid inflator discharge. This design also allows achievement of more arbitrary amounts of valved area because multiple rows of slots could be provided. There is not any fundamental limit on valved area arising from any consideration related to the circumference of the washer. If the spring is one or more Belleville washers, the design could be arranged so that the Belleville washer(s) has a non-linear force-deflection relationship, if that helps give desired pulse-shaping characteristics.

The other useful feature of this design is that it provides more opportunity to specify the relation between open flow area and position of the movable part. Various possibilities for slot geometries and associated area variations are shown in FIG. 13. The variation of the flow area occurs as the edges of slots 171 in piston 170 cover or uncover edges of slots 173 in cylinder 172. If all of the slots were of rectangular cross-section and began to open simultaneously, then the relation between flow area and position would again be a simple linear relationship. However, the width of the slots (their dimensional extent in the circumferential dimension, perpendicular to the direction of motion of the movable part) does not have to be constant. We may assume for ease of discussion that the slots 171 in the piston are of constant cross-section and the slots 173 in the cylinder are of more complicated shape. The slots 173 in cylinder are illustrated as being segments of rectangles joined to each other, although of course the periphery could also have any general contour. By such means it is possible for the slots 173 to have one circumferential extent when the movable part is only slightly deflected, and another different circumferential extent when the movable part is more deflected. For example, the shaping of the slot(s) could be such that at small deflections the full slot width were available and at greater deflections only a portion of the slot width were available. The reverse could also be done. Either of these would produce a relationship between open flow area and displacement which departs from a simple linear relationship.

It is also possible for multiple rows of simple rectangular slots to be used, where the slots do not all have to begin to be uncovered or covered simultaneously. The rows of slots could be positioned and dimensioned such that at small deflections all of the slots could be open and at larger deflections one or some of the slots would already be closed while other(s) remain open. A bilinear relationship with a bend in the opposite direction could similarly be achieved if multiple slots of simple rectangular cross-section were positioned and dimensioned such that initially all of the slots were open, and at small deflections only some of the slots would have their area changed by the moving edge of the piston, while at larger deflections all of the slots would affected by the motion of the piston.

It is possible that by tailoring more complicated flow area vs. position relationships such as are created here, there might be created a sharper break between the gentle-fill and rapid-fill portions of the transient. It is also possible that these orifices could be tailored so as to reduce the early rush of gas found in the first few milliseconds of the transient with the preceding embodiments. Other benefits might also be found arising from having more design options in the flow area vs. position relationship.

EMBODIMENT 11

Figure 14:
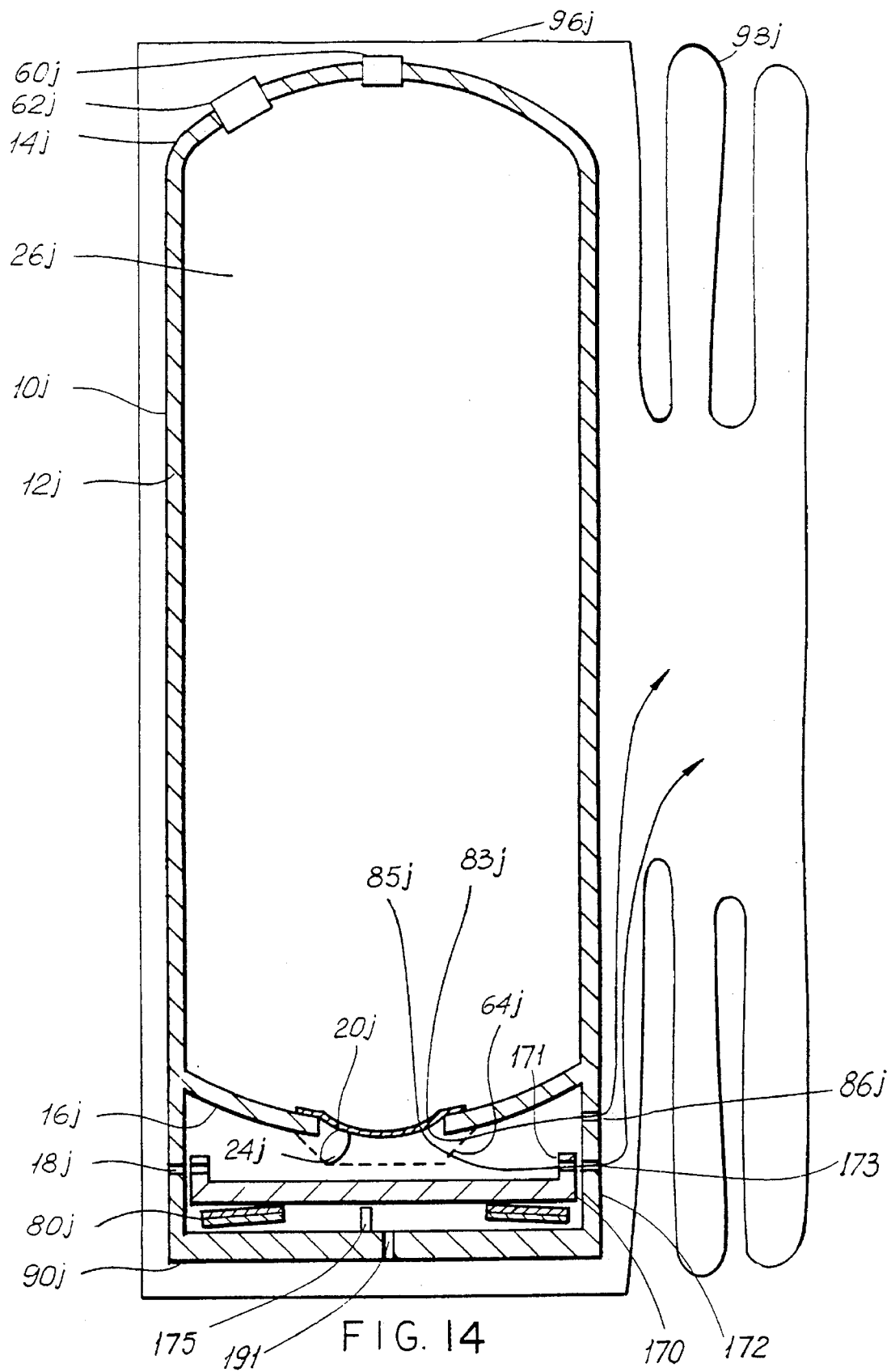
FIG. 14 is a tenth embodiment.

This embodiment is the same as embodiment 10 but with the use of bimetal to make it self-adjusting with respect to initial temperature. This is shown in FIG. 14 with like parts being similarly numbered with a subscript "j". Since this embodiment would be likely to be used with stored gas, igniter device 24j for inducing rupture of rupturable wall 20j is shown. The use of bimetal is possible with spring devices such as Belleville washers and leaf springs, so the device is illustrated with a Belleville washer 80j containing a low expansion side 80j' and a high expansion side 80j". The washer 80j could be mounted either right side up or upside-down and as mentioned in the previous embodiment, more than one such washer could be used. The bimetallic device must act such that at hot initial temperatures, the force required to push the movable part (piston) to the point where it bottoms against stop 175 is relatively larger, and at cold initial temperatures the force required to push the movable part (piston) to the point where it bottoms is relatively smaller. To accomplish this, the proper orientation of the bimetal layers is to have the low expansion side 80j' on the concave side of the washer and the high expansion side 80j" on the convex side. Thus, at hot initial conditions the initial position of piston 170 will be closer to pressure vessel 10 and it will have farther to travel before bottoming, than would be the case at cold initial conditions.

Although several embodiments of the invention have been disclosed and described in detail herein it should be understood that this invention is in no sense limited thereby and its scope is to be determined by that of the appended claims.

We claim:

1. A vehicular airbag inflator assembly comprising:

a vessel capable of containing a source of gas under pressure for inflating an airbag, said vessel having a sealed outlet and means for opening said sealed outlet in response to detection of a vehicle crash, pulse-shaping valving means located between said source of said gas and said airbag having a variable open flow area and a movable element and through which said gas entering said airbag must flow, for varying the flowrate of said gas flowing through said pulse-shaping valving means by controlling the open flow area of said pulse-shaping valving means as a function of the force exerted on said pulse-shaping valving means by said gas flowing through said pulse-shaping valving means, said force being related to the instantaneous difference between the pressure of said gas in said source and the pressure in said airbag, the pulse shaping valve means being so constructed and arranged such that the behavior of said open flow area of said pulse-shaping valving means is such that said open flow area of said pulse-shaping valving means generally decreases with increasing values of said force exerted on said movable element of said pulse-shaping valving means, but always remains at least as large as a minimum always-open flow area no matter how large said load becomes.

2. The invention in accordance with claim 1, wherein said pulse-shaping valving means comprises an always-open orifice whose area is constant and also a variable orifice whose area generally decreases with increasing pressure difference across said pulse-shaping valving means and can decrease to zero for sufficiently large values of pressure difference across said pulse-shaping valving means, said always-open orifice and said variable orifice being fluid mechanically in parallel with each other.

3. The invention in accordance with claim 1, wherein said open flow area of said pulse-shaping valving means is varied as a function of said load exerted on said movable element of said pulse-shaping valving means, by a spring-like member.

4. The invention in accordance with claim 3, wherein said spring-member is a washer having an inner circumference and an outer circumference, and disposed so that said force is exerted on said washer in a direction generally coincident with the principal cylindrical axis of said washer.

5. The invention in accordance with claim 4, wherein a seat means, along with an edge or surface of said washer facing said seat means, together define the minimum space which defines a variable orifice.

6. The invention of claim 5 wherein said inner circumference of said washer rests on a support which allows essentially no flow of said gas under said inner circumference, and said outer circumference of said washer is free to move and is disposed so that said gas can flow past it, said variable orifice being defined by said minimum space which is defined by said seat and said edge or surface of said washer facing said seat.

7. The invention of claim 5 wherein said outer circumference of said washer rests on a support which allows essentially no flow of said gas under said fixed outer circumference, and said inner circumference of said washer is free to move and is disposed so that said gas can flow past it, said variable orifice being defined by said minimum space which is defined by said seat and said edge or surface of said washer facing said seat.

8. The invention of claim 6 or claim 7, wherein said always-open orifice feature comprises castellations in said seat.

9. The invention of claim 6 or claim 7, wherein said always-open orifice feature comprises a hole or holes elsewhere in the fluid boundary which generally separates the upstream region upstream of said variable orifice from the downstream region downstream of said variable orifice.

10. The invention of claim 6, wherein said washer comprises bimetallic material so as to adjust the distance, between said seat and said edge or surface of said washer facing said seat, as a function of initial temperature, said distance increasing with increasing initial temperature, said distance being measured in a condition of zero load being applied to said washer.

11. The invention of claim 7, wherein said washer comprises bimetallic material so as to adjust the distance, between said seat and said edge or surface of said washer facing said seat, as a function of initial temperature, said distance increasing with increasing initial temperature, said distance being measured in a condition of zero load being applied to said washer.

12. The invention of claim 5 wherein said outer circumference of said washer rests on a support which is disposed to allow gas to flow under it at least intermittently, and said inner circumference of said washer is free to move and is disposed so that said gas can flow past it, said variable orifice being defined by the sum of a first minimum space which is defined by a first seat and a first edge of said washer facing said first seat, plus a second minimum space which is defined by a second seat and a second edge of said washer facing said second seat, said first seat valving flow which flowed past said inner circumference of said washer and said second seat valving flow which flowed past said outer circumference of said washer, said first seat and said second seat together defining a drain which conducts all of said gas out to said airbag.

13. The invention of claim 5 wherein said inner circumference of said washer rests on a support and is disposed to allow gas to flow under it at least intermittently, and said outer circumference of said Belleville washer is free to move and is disposed so that said gas can flow past it, said variable orifice being defined by the sum of a first minimum space which is defined by a first seat and a first edge of said washer facing said first seat, plus a second minimum space which is defined by a second seat and a second edge of said washer facing said second seat, said first seat valving flow which flowed past said inner circumference of said washer and said second seat valving flow which flowed past said outer circumference of said washer, said first seat and said second seat together defining a drain which conducts all of said gas out to said airbag.

14. The invention of claim 12 or claim 13, wherein said always-open orifice feature comprises castellations in at least one of said first seat and said second seat.

15. The invention of claim 12 or claim 13, wherein said always-open orifice feature comprises at least one hole elsewhere in the fluid boundary which generally separates the upstream region upstream of said variable orifice from the downstream region downstream of said variable orifice.

16. The invention of claim 12 or claim 13, wherein said always-open orifice feature comprises an always-open gap between said first seat and said first edge of said washer facing said first seat which exists when said washer is touching said second seat, or an always-open gap between said second seat and said second edge of said washer facing said second seat which exists when said washer is touching said first seat.

17. The invention of claim 12, wherein said washer comprises bimetallic material so as to adjust the first distance between said first seat and said first edge of said washer facing said first seat, as a function of initial temperature, and the second distance between said second seat and said second edge of said washer facing said second seat, said first distance and said second distance both being measured in a condition of zero load being applied to said washer, said first distance and said second distance both increasing with increasing initial temperature.

18. The invention of claim 13, wherein said washer comprises bimetallic material so as to adjust the first distance between said first seat and said first edge of said washer facing said first seat, as a function of initial temperature, and similarly the second distance between said second seat and said second edge of said washer facing said second seat, said first distance and said second distance both being measured in a condition of zero load being applied to said washer, said first distance and said second distance both increasing with increasing initial temperature.

19. The invention of claim 5, wherein said seat has a predetermined configuration so as to provide an increased perimeter, recessed regions being provided such that the minimum flow area is defined by the space between said seat and said surface of said washer facing said seat, with all local flow areas leading up to and leading away from said minimum flow area being larger than said minimum flow area.

20. The invention of claim 19, wherein said washer comprises bimetallic material so as to adjust the distance, between said seat and said edge of said washer facing said seat, as a function of initial temperature, said distance increasing with increasing initial temperature, said distance being measured in a condition of zero load being applied to said washer.

21. The invention of claim 5, wherein there are provided a plurality of seats each defining a closed loop, the interior of each of said closed loops being open so as to define a drain, all of said drains being fluid mechanically in parallel with each other, recessed regions being provided if necessary such that the minimum flow area is defined by the space between said seat and said surface of said washer facing said seat, with all local flow areas leading up to and leading away from said minimum flow area being larger than said minimum flow area.

22. The invention of claim 21, wherein said washer comprises bimetallic material so as to adjust the distance, between said seat and said edge of said washer facing said seat, as a function of initial temperature, said distance increasing with increasing initial temperature, said distance being measured in a condition of zero load being applied to said washer.

23. The invention of claim 5, wherein the initial gap varies with initial temperature, said initial gap being defined as the distance between said seat or seats and the nearby edge or surface of said washer, said seat and said edge of surface of said washer together defining said minimum flow area.

24. The invention of claim 23, wherein said variation of initial gap results from changes in the height dimension of said washer, said height dimension being defined as the distance, along the axial direction of said washer which is axisymmetric, between the edge of said washer extending furthest in one direction along the axial direction and the edge of said washer which extends furthest in the other direction along the axial direction, said distance being measured in a condition of zero load being applied to said washer, with said seat remaining in a constant location regardless of initial temperature.

25. The invention of claim 24, wherein said changes in said height dimension of said washer are accomplished by making said washer from a bimetallic material comprising a layer of low thermal expansion material and a layer of high thermal expansion material bonded to each other, said layers of said materials being oriented so as to adjust the distance between said washer and said seat or seats as a function of initial temperature, said distance increasing with increasing initial temperature, said distance being measured in a condition of zero load being applied to said washer.

26. The invention of claim 25, wherein said bimetallic material comprises a high expansion material of composition 22% Ni, 3% Cr, balance Fe and a low expansion material of composition 36% Ni, balance Fe.

27. The invention of claim 23, wherein said washer maintains its position independent of initial temperature, said position being measured when zero load or pressure difference acts on said washer, and said seat adjusts its position as a function of initial temperature.

28. The invention in accordance with claim 27, wherein said position of said seat is adjusted as a function of said initial temperature by means of one of said seat and the structure which positions said seat being made of a material having a coefficient of thermal expansion which is different from the coefficient of thermal expansion of the material used for said washer and the structure which positions said washer, said seat being allowed to move relative to said washer under influence of thermal expansion.

29. The invention in accordance with claim 28, wherein said position of said seat is adjusted by thermal displacement in a direction which is generally coincident with the axial direction of the principal geometry of said generally axisymmetric pulse-shaping valving means.

30. The invention in accordance with claim 28, wherein said position of said seat is adjusted by thermal displacement of said seat in a direction which is generally radial with respect to the principal axes of said generally axisymmetric pulse-shaping valving means, said seat comprising an angled surface against which a movable edge of said washer can rest, said angled surface being disposed such that displacement of said seat in said radial direction results in a change in the axial distance which said movable edge of said washer must move before touching said angled surface.

31. The invention in accordance with claim 30, further comprising centering means for maintaining said seat coaxial with the principal axis of said washer, as said seat expands and contracts due to changes in initial temperature.

32. The invention in accordance with claim 30, further comprising an O-ring used for preventing flow of gas through a gap which may open up due to said thermal displacement of said seat.

33. The invention in accordance with claim 32, wherein said O-ring used for preventing said flow of gas is also said centering means.

34. The invention in accordance with claim 30, wherein the axial location of said O-ring is chosen such that there is approximately zero net radially outward force or net radially inward force on said thermal expansion seat ring due to fluid pressures during the transient.

35. The invention of claim 30, further comprising thermal displacement of said seat in the axial direction, in addition to said thermal displacement of said seat in the radial direction.

36. The invention in accordance with claim 29, or claim 30 or claim 35, wherein said seat or said structure which determines position of said seat is made of a polymeric material.

37. The invention in accordance with claim 36, wherein said polymeric material is polytetrafluoroethylene.

38. The invention of claim 3, wherein said movable element of said pulse-shaping valving means, which moves in response to said force, comprises a piston which is disposed inside a cylinder, said force being exerted on said piston by said gas flowing through said pulse-shaping valving means, said load being reacted by said spring-like member said open flow area being defined by at least one of the edges in said piston further acting to cover and uncover slots in said cylinder as a function of the position of said piston.

39. The invention of claim 38, wherein said spring-like member is at least one Belleville washer.

40. The invention of claim 39, wherein said Belleville washer is used in a parameter range wherein the force-deflection curve of said Belleville washer is non-linear.

41. The invention of claim 38, wherein said spring-like member is a leaf spring.

42. The invention in accordance with claim 4, wherein said washer is a washer which has been deformed so that in the absence of any external force said inner circumference of said washer and said outer circumference of said washer are displaced out of coplanarity by a displacement distance which is a small fraction of the outer diameter of said washer, said deformed washer being a Belleville washer.

43. The invention in accordance with claim 42, wherein said Belleville washer is disposed such that the direction of said force exerted by said fluid pressure difference is such that said force tends to reduce said displacement distance of said Belleville washer.

44. The invention of claim 4, wherein said washer comprises high strength steel.

45. The invention of claim 42, wherein said Belleville washer is used in a parameter range wherein the force-deflection curve of said Belleville washer is non-linear.

46. The invention of claim 38, wherein said spring-like member is a coil spring.

47. The invention of claim 38, wherein said slot has a periphery such that the circumferential extent of said slot varies as a function of distance of displacement of said piston.

48. The invention of claim 47, wherein said slot in said cylinder and said slot in said piston become progressively wider as said piston undergoes increasing deflection from the position said piston occupies when zero force is exerted on it.

49. The invention of claim 47, wherein said slot in said cylinder and said slot in said piston become progressively narrower as said piston undergoes increasing deflection from its rest position, said rest position referring to the position said piston occupies when zero force is exerted on it.

50. The invention of claim 38, wherein said slot in said piston and said slot in said cylinder comprise a plurality of rows of slots, some of said slots starting to be covered when said piston begins to be displaced away from its rest position, and others of said slots starting to be covered at some displacement position further than the unloaded position of said piston.

51. The invention of claim 38, wherein said slots in said piston and said slots in said cylinder comprise a plurality of rows of slots, some of said slots finishing being covered when said piston reaches a particular displacement, and others of said slots finishing being covered at some displacement before said piston reaches said particular displacement.

52. A vehicular airbag inflator comprising:

a vessel for a source of gas under pressure for inflating an airbag, the vessel having a sealed outlet and means for opening the outlet in response to detection of a vehicle crash, a passage network for coupling the outlet with the interior of the airbag, pulse-shaping valving means for shaping the pulse of gas flowing through the passage network as a function of the flow pressure of gas through the outlet whereby the flowrate of gas through the passage network following the opening of the outlet is controlled so that a monotonic pressure versus time curve may be achieved for the gas flowing through the passage network, the pulse-shaping means being operable to provide a flowrate of gas that has a relatively slower value over time followed by a more rapid value, followed by a tapering off during the brief period of time of a vehicle crash, the passage network has a first part that is always open to provide the relatively slower value of gas flowrate, and a second part wherein the pulse-shaping means include a Belleville washer normally opening the second part of the passage network and closing the second part upon the attainment of a predetermined gas pressure within the passage network to provide the relatively slower value of gas flowrate and opening the second part upon the attainment of a lower gas pressure to provide the more rapid value of gas flowrate followed by the tapering off.

53. The invention in accordance with claim 52 wherein the washer is bimetallic to adjust the position of the washer in response to ambient temperature.

54. The invention in accordance with claim 52 wherein the washer includes an outer circumferential edge and an inner circumferential edge, and means for anchoring the inner edge.

55. The invention in accordance with claim 52 wherein the washer includes an outer circumferential edge and an inner circumferential edge, and means for anchoring the outer edge.

56. The invention in accordance with claim 52 wherein the Belleville washer is so constructed and arranged to maintain the second part of the passage network open initially only for a brief moment before said closing.

57. A vehicular airbag inflator comprising:

a vessel for a source of gas under pressure for inflating an airbag, the vessel having a sealed outlet and means for opening the outlet in response to detection of a vehicle crash, a passage network for coupling the outlet with the interior of the airbag, pulse-shaping valving means for shaping the pulse of gas flowing through the passage network as a function of the flow pressure of gas through the outlet whereby the flowrate of gas through the passage network following the opening of the outlet is controlled so that a monotonic pressure versus time curve may be achieved for the gas flowing through the passage network, the passage network having a first part that is always open to provide the relatively slower value of gas flowrate;

a valve means normally opening the second part of the passage network, a Belleville washer coupled with the valve means for actuating the valve means to close the second part upon the attainment of a predetermined gas pressure within the passage network to provide the slower value of gas flowrate and further actuate the valve means to open the second part upon the attainment of a lower predetermined gas pressure within the passage network to provide the more rapid value of gas flowrate followed by the tapering off.

58. The invention in accordance with claim 57 wherein the washer is bimetallic to adjust the position of the washer in response to ambient temperature.

59. The invention in accordance with claim 57 wherein the washer includes an outer circumferential edge and an inner circumferential edge, and means for anchoring the inner edge.

60. The invention in accordance with claim 57 wherein the washer includes an outer circumferential edge and an inner circumferential edge, and means for anchoring the outer edge.

61. The invention in accordance with claim 57 wherein the Belleville washer is so constructed and arranged to maintain the second part of the passage network open initially only for a brief moment before said closing.

62. A vehicular airbag inflator comprising:

a vessel for a source of gas under pressure for inflating an airbag, the vessel having a sealed outlet and means for opening the outlet in response to detection of a vehicle crash, a passage network for coupling the outlet with the interior of the airbag, pulse-shaping valving means for shaping the pulse of gas flowing through the passage network as a function of the flow pressure of gas through the outlet whereby the flowrate of gas through the passage network following the opening of the outlet is controlled so that a monotonic pressure versus time curve may be achieved for the gas flowing through the passage network, a housing mounting the vessel and an airbag coupled with the housing and having an interior in fluid communication with the network upon opening the outlet.

63. A vehicular airbag inflator assembly comprising:

a vessel capable of containing a source of gas under pressure for inflating an airbag, said vessel having a sealed outlet and means for opening said sealed outlet in response to detection of a vehicle crash, pulse-shaping valving means located between said source of said gas and said airbag having a variable open flow area and a movable element and through which said gas entering said airbag must flow, for varying the flowrate of said gas flowing through said pulse-shaping valving means by controlling the open flow area of said pulse-shaping valving means as a function of the force exerted on said pulse-shaping valving means by said gas flowing through said pulse-shaping valving means, said force being related to the instantaneous difference between the pressure of said gas in said source and the pressure in said airbag, prior to the time when said sealed outlet being caused to open in response to said detection of a vehicle crash, said pulse-shaping valving means being in a position such that said open flow area is fully open; and wherein upon opening of said sealed outlet and establishment of a predetermined pressure difference across said pulse-shaping valving means said open flow area decreases, whereby the flowrate of gas is reduced; and wherein upon the attainment of a predetermined smaller pressure difference across said pulse-shaping valving means, said pulse-shaping valving means increases said open flow area, whereby said flowrate of gas is increased; and wherein, for the remainder of the transient thereafter, said open flow area either continues to increase or remains fully open.

* * * * *

UNITED STATES PATENT AND TRADEMARK OFFICE
CERTIFICATE OF CORRECTION

PATENT NO. : 5,551,723

DATED : Sep. 3, 1996

INVENTOR(S) : Geoffrey L. Mahon, Peter Materna

It is certified that error appears in the above-identified patent and that said Letters Patent is hereby corrected as shown below:

Column 19, line 22 between "*" and "b" insert --(--.

Signed and Sealed this

Twelfth Day of November, 1996

Attest:

BRUCE LEHMAN

Attesting Officer

Commissioner of Patents and Trademarks